US011816541B2

(12) United States Patent
Merrill et al.

(10) Patent No.: US 11,816,541 B2
(45) Date of Patent: Nov. 14, 2023

(54) SYSTEMS AND METHODS FOR DECOMPOSITION OF DIFFERENTIABLE AND NON-DIFFERENTIABLE MODELS

(71) Applicant: ZestFinance, Inc., Los Angeles, CA (US)

(72) Inventors: John Wickens Lamb Merrill, Los Angeles, CA (US); Geoffrey Michael Ward, Los Angeles, CA (US); Sean Javad Kamkar, Los Angeles, CA (US); John Joseph Beahan, Jr., Los Angeles, CA (US); Mark Frederick Eberstein, Los Angeles, CA (US); Jose Efrain Valentin, Los Angeles, CA (US); Jerome Louis Budzik, Los Angeles, CA (US)

(73) Assignee: ZestFinance, Inc., Burbank, CA (US)

( * ) Notice: Subject to any disclaimer, the term of this patent is extended or adjusted under 35 U.S.C. 154(b) by 621 days.

(21) Appl. No.: 16/688,789

(22) Filed: Nov. 19, 2019

(65) Prior Publication Data

US 2020/0265336 A1    Aug. 20, 2020

Related U.S. Application Data

(60) Provisional application No. 62/806,603, filed on Feb. 15, 2019.

(51) Int. Cl.
| | | |
|---|---|---|
| G06F 16/00 | (2019.01) | |
| G06N 20/00 | (2019.01) | |
| G06F 16/901 | (2019.01) | |
| G06N 5/045 | (2023.01) | |

(52) U.S. Cl.
CPC .......... *G06N 20/00* (2019.01); *G06F 16/9027* (2019.01); *G06N 5/045* (2013.01)

(58) Field of Classification Search
CPC ...... G06N 20/00; G06N 5/045; G06N 3/0454; G06N 5/003; G06N 7/005; G06N 20/20; G06F 16/9027
See application file for complete search history.

(56) References Cited

U.S. PATENT DOCUMENTS

| | | |
|---|---|---|
| 525,413 A | 9/1894 | Gates |
| 5,745,654 A | 4/1998 | Titan |
| 5,999,938 A | 12/1999 | Bliss et al. |
| 6,034,314 A | 3/2000 | Koike |
| 6,877,656 B1 | 4/2005 | Jaros et al. |

(Continued)

FOREIGN PATENT DOCUMENTS

| | | |
|---|---|---|
| WO | 2014014047 A1 | 1/2014 |
| WO | 2014055238 A1 | 4/2014 |

(Continued)

OTHER PUBLICATIONS

Lippert, J. (2014, Oct. 12). "ZestFinance issues small, high-rate loans, uses big data to weed out deadbeats" (Year: 2014).*

(Continued)

*Primary Examiner* — Jean M Corrielus
(74) *Attorney, Agent, or Firm* — TROUTMAN PEPPER HAMILTON SANDERS LLP; Christopher J. Forstner; Nicholas J. Gallo

(57) ABSTRACT

Systems and methods for understanding diverse machine learning models.

19 Claims, 16 Drawing Sheets

(56) References Cited

U.S. PATENT DOCUMENTS

| | | |
|---|---|---|
| 7,035,811 B2 | 4/2006 | Gorenstein |
| 7,280,980 B1 | 10/2007 | Hoadley et al. |
| 7,467,116 B2 | 12/2008 | Wang |
| 7,499,919 B2 | 3/2009 | Meyerzon et al. |
| 7,542,993 B2 | 6/2009 | Satterfield et al. |
| 7,610,257 B1 | 10/2009 | Abrahams |
| 7,711,635 B2 | 5/2010 | Steele et al. |
| 7,765,151 B1 | 7/2010 | Williams et al. |
| 7,813,945 B2 | 10/2010 | Bonissone et al. |
| 7,873,535 B2 | 1/2011 | Umblijs et al. |
| 7,873,570 B2 | 1/2011 | Cagan et al. |
| 7,921,359 B2 | 4/2011 | Friebel |
| 7,941,363 B2 | 5/2011 | Tanaka et al. |
| 7,941,425 B2 | 5/2011 | Sahu et al. |
| 7,970,676 B2 | 6/2011 | Feinstein |
| 7,987,177 B2 | 7/2011 | Beyer et al. |
| 7,996,392 B2 | 8/2011 | Liao et al. |
| 8,078,524 B2 | 12/2011 | Crawford et al. |
| 8,086,523 B1 | 12/2011 | Palmer |
| 8,166,000 B2 | 4/2012 | Labrie et al. |
| 8,200,511 B2 | 6/2012 | Zizzamia et al. |
| 8,219,500 B2 | 7/2012 | Galbreath et al. |
| 8,280,805 B1 | 10/2012 | Abrahams |
| 8,335,741 B2 | 12/2012 | Kornegay et al. |
| 8,442,886 B1 | 5/2013 | Haggerty et al. |
| 8,452,699 B2 | 5/2013 | Crooks |
| 8,515,842 B2 | 8/2013 | Papadimitriou |
| 8,554,756 B2 | 10/2013 | Gemmell et al. |
| 8,560,436 B2 | 10/2013 | Lau et al. |
| 8,600,966 B2 | 12/2013 | Kravcik |
| 8,626,645 B1 | 1/2014 | Lazerson |
| 8,645,417 B2 | 2/2014 | Groeneveld et al. |
| 8,660,943 B1 | 2/2014 | Chirehdast |
| 8,694,401 B2 | 4/2014 | Stewart |
| 8,744,946 B2 | 6/2014 | Shelton |
| 8,799,150 B2 | 8/2014 | Annappindi |
| 9,047,392 B2 | 6/2015 | Wilkes et al. |
| 9,268,850 B2 | 2/2016 | El-Charif et al. |
| 9,405,835 B2 | 8/2016 | Wheeler et al. |
| 9,501,749 B1 | 11/2016 | Narsky |
| 9,686,863 B2 | 6/2017 | Chung et al. |
| 10,121,115 B2 | 11/2018 | Chrapko |
| 10,581,887 B1 | 3/2020 | Dinerstein |
| 10,586,280 B2 * | 3/2020 | McKenna ............ G06N 20/00 |
| 10,684,598 B1 | 6/2020 | Alanqar et al. |
| 10,719,301 B1 | 7/2020 | Dasgupta et al. |
| 10,824,959 B1 | 11/2020 | Chatterjee |
| 10,977,558 B2 | 4/2021 | Herbster |
| 2002/0038277 A1 | 3/2002 | Yuan |
| 2002/0091650 A1 | 7/2002 | Ellis |
| 2002/0138414 A1 | 9/2002 | Baker |
| 2002/0178113 A1 | 11/2002 | Clifford et al. |
| 2003/0009369 A1 | 1/2003 | Gorenstein |
| 2003/0033242 A1 | 2/2003 | Lynch et al. |
| 2003/0033587 A1 | 2/2003 | Ferguson et al. |
| 2003/0046223 A1 | 3/2003 | Crawford et al. |
| 2003/0101080 A1 | 5/2003 | Zizzamia et al. |
| 2003/0147558 A1 | 8/2003 | Loui et al. |
| 2003/0176931 A1 | 9/2003 | Pednault |
| 2004/0068509 A1 | 4/2004 | Garden et al. |
| 2004/0107161 A1 | 6/2004 | Tanaka et al. |
| 2004/0199456 A1 | 10/2004 | Flint et al. |
| 2005/0055296 A1 | 3/2005 | Hattersley et al. |
| 2005/0114279 A1 | 5/2005 | Scarborough et al. |
| 2005/0234762 A1 | 10/2005 | Pinto |
| 2005/0278246 A1 | 12/2005 | Friedman et al. |
| 2006/0047613 A1 | 3/2006 | Labreuche |
| 2006/0083214 A1 | 4/2006 | Grim, III |
| 2006/0106570 A1 | 5/2006 | Feldman |
| 2006/0112039 A1 | 5/2006 | Wang |
| 2006/0167654 A1 | 7/2006 | Keinan et al. |
| 2006/0200396 A1 | 9/2006 | Satterfield et al. |
| 2006/0218067 A1 | 9/2006 | Steele |
| 2007/0005313 A1 | 1/2007 | Sevastyanov |
| 2007/0011175 A1 | 1/2007 | Langseth |
| 2007/0016542 A1 | 1/2007 | Rosauer et al. |
| 2007/0050286 A1 | 3/2007 | Abrahams |
| 2007/0055619 A1 | 3/2007 | Abrahams et al. |
| 2007/0067284 A1 | 3/2007 | Meyerzon et al. |
| 2007/0106550 A1 | 5/2007 | Umblijs et al. |
| 2007/0112668 A1 | 5/2007 | Celano et al. |
| 2007/0124236 A1 | 5/2007 | Grichnik et al. |
| 2007/0288338 A1 | 12/2007 | Hoadley et al. |
| 2008/0133402 A1 | 6/2008 | Kurian et al. |
| 2008/0208820 A1 | 8/2008 | Usey et al. |
| 2008/0222061 A1 | 9/2008 | Soetjahja |
| 2008/0306893 A1 | 12/2008 | Saidi et al. |
| 2008/0307006 A1 | 12/2008 | Lee |
| 2009/0006283 A1 | 1/2009 | Labrie et al. |
| 2009/0006356 A1 | 1/2009 | Liao et al. |
| 2009/0015433 A1 | 1/2009 | James |
| 2009/0024517 A1 | 1/2009 | Crooks |
| 2009/0030888 A1 | 1/2009 | Sahu et al. |
| 2009/0037308 A1 | 2/2009 | Feinstein |
| 2009/0192980 A1 | 7/2009 | Beyer et al. |
| 2009/0216748 A1 | 8/2009 | Kravcik |
| 2009/0254572 A1 | 10/2009 | Redlich et al. |
| 2009/0299911 A1 | 12/2009 | Abrahams |
| 2009/0319521 A1 | 12/2009 | Groeneveld et al. |
| 2010/0005018 A1 | 1/2010 | Tidwell |
| 2010/0010878 A1 | 1/2010 | Pinto et al. |
| 2010/0010935 A1 | 1/2010 | Shelton |
| 2010/0082476 A1 | 4/2010 | Bowman |
| 2010/0257459 A1 | 10/2010 | Galbreath et al. |
| 2010/0325067 A1 | 12/2010 | Cagan et al. |
| 2011/0071969 A1 | 3/2011 | Doctor et al. |
| 2011/0078073 A1 | 3/2011 | Annappindi |
| 2011/0112957 A1 | 5/2011 | Ingram et al. |
| 2011/0161263 A1 | 6/2011 | Lee |
| 2011/0173116 A1 | 7/2011 | Yan |
| 2011/0178902 A1 | 7/2011 | Imrey |
| 2011/0184941 A1 | 7/2011 | El-Charif et al. |
| 2011/0320423 A1 | 12/2011 | Gemmell et al. |
| 2012/0053951 A1 | 3/2012 | Kowalchuk et al. |
| 2012/0059819 A1 | 3/2012 | Wheeler et al. |
| 2012/0066106 A1 | 3/2012 | Papadimitriou |
| 2012/0066116 A1 | 3/2012 | Kornegay et al. |
| 2012/0072029 A1 | 3/2012 | Persaud et al. |
| 2012/0082476 A1 | 4/2012 | Ito et al. |
| 2012/0239613 A1 | 9/2012 | Danciu |
| 2013/0091050 A1 | 4/2013 | Merrill |
| 2013/0103569 A1 | 4/2013 | Gopinathan |
| 2013/0138553 A1 | 5/2013 | Nikankin et al. |
| 2013/0185189 A1 | 7/2013 | Stewart |
| 2014/0012794 A1 | 1/2014 | Dillon et al. |
| 2014/0014047 A1 | 1/2014 | Garcia et al. |
| 2014/0025872 A1 | 1/2014 | Flynn |
| 2014/0052604 A9 | 2/2014 | Stewart |
| 2014/0081832 A1 | 3/2014 | Merrill et al. |
| 2014/0108665 A1 | 4/2014 | Arora |
| 2014/0122355 A1 | 5/2014 | Hardtke et al. |
| 2014/0149177 A1 | 5/2014 | Frank et al. |
| 2014/0172886 A1 | 6/2014 | Wilkes et al. |
| 2014/0180790 A1 | 6/2014 | Boal |
| 2014/0181267 A1 | 6/2014 | Wadkins |
| 2014/0310661 A1 | 10/2014 | Frederickson et al. |
| 2014/0310681 A1 | 10/2014 | Poozhiyil |
| 2015/0019912 A1 | 1/2015 | Darling et al. |
| 2015/0056229 A1 | 2/2015 | Nandy et al. |
| 2015/0081602 A1 | 3/2015 | Talley et al. |
| 2015/0161098 A1 | 6/2015 | Granshaw |
| 2015/0213361 A1 | 7/2015 | Gamon |
| 2015/0317337 A1 | 11/2015 | Edgar |
| 2015/0347485 A1 | 12/2015 | Cai |
| 2015/0379428 A1 | 12/2015 | Dirac et al. |
| 2016/0042292 A1 | 2/2016 | Caplan |
| 2016/0088723 A1 | 3/2016 | Chung et al. |
| 2016/0110353 A1 | 4/2016 | Merrill et al. |
| 2016/0132787 A1 | 5/2016 | Drevo et al. |
| 2016/0300252 A1 * | 10/2016 | Frank ............... G06F 16/24578 |
| 2016/0371238 A1 | 12/2016 | Heavenrich |
| 2017/0061326 A1 | 3/2017 | Talathi et al. |
| 2017/0109657 A1 | 4/2017 | Marcu |
| 2017/0124464 A1 | 5/2017 | Crabtree et al. |

(56) References Cited

U.S. PATENT DOCUMENTS

| | | |
|---|---|---|
| 2017/0140518 A1 | 5/2017 | Liang et al. |
| 2017/0220633 A1 | 8/2017 | Porath |
| 2017/0222960 A1 | 8/2017 | Agarwal et al. |
| 2017/0316311 A1 | 11/2017 | Pilly |
| 2017/0330058 A1 | 11/2017 | Silberman et al. |
| 2018/0018578 A1* | 1/2018 | Yoshizumi ............ G06Q 10/04 |
| 2018/0025273 A1 | 1/2018 | Jordan |
| 2018/0060738 A1 | 3/2018 | Achin |
| 2018/0068219 A1 | 3/2018 | Turner et al. |
| 2018/0268262 A1 | 9/2018 | Osada |
| 2018/0293712 A1 | 10/2018 | Vogels et al. |
| 2018/0322406 A1 | 11/2018 | Merrill et al. |
| 2018/0349986 A1 | 12/2018 | Fidanza |
| 2019/0043070 A1 | 2/2019 | Merrill et al. |
| 2019/0114704 A1 | 4/2019 | Way |
| 2019/0228006 A1* | 7/2019 | Tormasov ............ H04L 9/3239 |
| 2019/0236480 A1* | 8/2019 | McKenna ............ G06N 20/20 |
| 2019/0236484 A1* | 8/2019 | McKenna ............ G06N 20/20 |
| 2019/0236695 A1* | 8/2019 | McKenna ............ G06F 21/577 |
| 2019/0244122 A1 | 8/2019 | Li |
| 2019/0279111 A1* | 9/2019 | Merrill .................. G06N 20/20 |
| 2019/0287025 A1 | 9/2019 | Perez |
| 2019/0303404 A1 | 10/2019 | Amer |
| 2019/0311298 A1 | 10/2019 | Kopp et al. |
| 2019/0318421 A1 | 10/2019 | Lyonnet |
| 2019/0340518 A1 | 11/2019 | Merrill |
| 2019/0340684 A1 | 11/2019 | Belanger et al. |
| 2019/0354806 A1 | 11/2019 | Chhabra |
| 2019/0354853 A1 | 11/2019 | Zoldi |
| 2019/0378210 A1* | 12/2019 | Merrill .................... G06N 5/01 |
| 2020/0005136 A1 | 1/2020 | Spryn |
| 2020/0012917 A1 | 1/2020 | Pham et al. |
| 2020/0082299 A1 | 3/2020 | Vasconcelos |
| 2020/0160177 A1 | 5/2020 | Durand |
| 2020/0175586 A1* | 6/2020 | McKenna ............ G06N 20/20 |
| 2020/0183047 A1 | 6/2020 | Denli et al. |
| 2020/0231466 A1 | 7/2020 | Lu |
| 2020/0242492 A1* | 7/2020 | Goel ...................... G06N 20/20 |
| 2020/0257927 A1* | 8/2020 | Nomi ...................... G06N 20/00 |
| 2020/0257961 A1 | 8/2020 | Hua et al. |
| 2021/0019603 A1 | 1/2021 | Friedman |
| 2021/0133631 A1 | 5/2021 | Prendki |
| 2021/0209688 A1 | 7/2021 | Krishnamurthy |
| 2021/0224605 A1 | 7/2021 | Zhang |
| 2021/0256392 A1 | 8/2021 | Chen |
| 2021/0281491 A1 | 9/2021 | Yelahanka Raghuprasad |
| 2021/0406815 A1 | 12/2021 | Mimassi |
| 2022/0019741 A1 | 1/2022 | Roy |
| 2022/0122171 A1 | 4/2022 | Hubard |
| 2022/0188519 A1 | 6/2022 | Briody |
| 2022/0188568 A1 | 6/2022 | Singh |
| 2022/0191332 A1 | 6/2022 | Ahmadi |

FOREIGN PATENT DOCUMENTS

| | | |
|---|---|---|
| WO | 2014121019 A1 | 8/2014 |
| WO | 2014184381 A2 | 11/2014 |
| WO | 2015056229 A1 | 4/2015 |
| WO | 2015081160 A1 | 6/2015 |
| WO | 2019028179 A1 | 2/2019 |

OTHER PUBLICATIONS

Merrill, J. etal (2019). "Generalized integrated gradients: Apractical method forexplaining diverse ensembles" (Year: 2019).*

Zhang, et al., 2018. "Mitigating Unwanted Biases with Adversarial Learning," In Proceedings of the 2018 AAAI/ACM Conference on AI, Ethics, and Society (AIES '18). Association for Computing Machinery, New York, NY, USA, 335-340.

International Search Report issued in PCT/US2013/060208, dated Jan. 7, 2014, 2 pages.

Zhao, Zheng , et al., "On Similarity Preserving Feature Selection", IEEE Transactions on Knowledge and Data Engineering 25,2011, pp. 619-632.

Demaine, Erik D., et al., "Correlation clustering in general weighted graphs", Theorectical Computer Science 361 2006)172-187.

Ivanov, Alexei, et al., "Kolmogorov-Smirnov test for feature selection in emotion recognition from speech", IEEE International Conference on acoustics, speech and signal processing (ICASSP), 2012, pp. 5125-5128.

International Preliminary Report on Patentability issued in PCT/US2013/060208, dated Mar. 24, 2015, 8 pages.

Bit Array, Wikipedia Search, May 5, 2021 at https://en.wikipedia.org/wiki/Bit_array.

Genetic algorithm, Wikipedia Search, May 5, 2021 at https://en.wikipedia.org/wiki/Gentic_algorithm.

"Feature Selection" from Wikipedia and obtained in the Wayback machine at URL "https://en.wikipedia.org/wiki/Feature_selection" for Feb. 25, 2021.

"Feature Selection", Wikipedia and obtained in the Wayback machine at URL http://en.wikipedia.org/wiki/Feature_selection, Sep. 1, 2011.

Bittencourt, H.R. et al., "Feature Selection by Using Classification and Regression Trees (CART)", dated Aug. 23, 2004.

Strobl, Carolin , et al., "Conditional Variable Importance for Random Forests", BMC Bioinformatics 2008, 9:307, published Jul. 11, 2008.

Tuv, Eugene , et al., "Feature Selection with Ensembles, Artificial Variables, and Redundancy Elimination", Journal of Machine Learning Research, pp. 1341-1366, Jul. 2009.

"On the Convergence of Generalized Hill Climbing Algorithms" by A.W. Johnson et al. copyright 2002, Elsevier Science B.V., Discrete Applied Mathematics (Year: 2002).

Office Action (Non-Final Rejection) dated Dec. 16, 2021 for U.S. Appl. No. 15/977,105 (pp. 1-19).

International Search Report dated May 5, 2014 in corresponding PCT Application No. PCT/US2014/014047.

International Preliminary Report on Patentability dated Aug. 4, 2015 in corresponding PCT Application No. PCT/US2014/014047.

Office Action (Final Rejection) dated Dec. 7, 2021 for U.S. Appl. No. 16/109,545 (pp. 1-17).

International Search Report and the Written Opinion, Application No. PCT/US14/014047, dated May 5, 2014.

Office Action (Notice of Allowance and Fees Due (PTOL-85)) dated Nov. 19, 2021 for U.S. Appl. No. 16/292,844 (pp. 1-8).

Mondarres, Ceena et al., Towards Explainable Deep Learning for Credit Lending: A Case Study Proc. Workshop Challenges Opportunities AI Financial Services: Impact Fairness Explainability Accuracy Privacy (NIPS), 2018 (Year: 2018).

Chen, Jiahao, Fair lending needs explainable models for responsible recommendation Proceedings of the Second Workshop on Responsible Recommendation, 2018 (Year: 2018).

Ribeiro, Marco Tulio et al., Why Should I Trust You?—Explaining Predictions of Any Classifier ACM, 2016 (Year: 2016).

Gates, Susan Wharton et al., 4/3 Automated Underwriting: Friend or Foe to Low-Mod Households and Neighborhoods? Building Assets, Building Credit, Symposium, Nov. 2003 (Year: 2003).

Wattenber, Martin et al., Attacking discrimination with smarter machine learning Google Research, 2016 (Year: 2016).

Data Bias and Algorithmic Discrimination University of Montreal, 2017 (Year: 2017).

Office Action (Final Rejection) dated Nov. 18, 2021 for U.S. Appl. No. 16/052,293 (pp. 1-18).

International Search Report and Written Opinion for application No. PCT/US20/062271 dated Feb. 26, 2021.

International Search Report and Written Opinion issued in PCT/US2020/062235, dated Mar. 10, 2021, 8 pages.

International Search Report and Written Opinion issued in PCT/US2020/062271, dated Feb. 26, 2021, 8 pages.

International Search Report and Written Opinion for International Application No. PCT/US18/030966, dated Jul. 20, 2018.

"Gehrlein, William et al., A two-stage least cost credit scoring model, 1997, Annals of Operations Research, pp. 159-171."

"International Search Report and the Written Opinion for Application No. PCT/US18/44874, dated Oct. 10, 2018", Oct. 10, 2018.

(56) References Cited

OTHER PUBLICATIONS

"International Search Report and Written Opinion of the ISA, dated Jul. 5, 2019, for application No. PCT/US19/021381."
"International Search Report and Written Opinion of the ISA, dated Sep. 16, 2019, for application No. PCT/US19/029148."
"International Search Report and Written Opinion of the ISA, dated Aug. 23, 2019, for application No. PCT/US19/036049."
Abadi, Martin, et al., "TensorFlow: Large-Scale Machine Learning on Heterogeneous Distributed Systems", Preliminary White Paper, Nov. 9, 2015.
Breiman, Leo, et al., "Random Forests", Machine Learning, 45, 5-32, 2001.
Chen, Tianqi, et al., "XGBoost: A Scalable Tree Boosting System", KDD '16, Aug. 13-17, 2016, San Francisco, CA, USA.
Cortes, Corinna, et al., "Support-Vector Networks", AT&T Labs-Research, USA, Journal Machine Learning, vol. 20, Issue 3, Sep. 1995.
Friedman, Jerome H., "Greedy Function Approximation: A Gradient Boosting Machine", IMS 1999 Reitz Lecture, Feb. 24, 1999.
Garcia-Pedradas, Nicolas, et al., "Nonlinear Boosting Projections for Ensemble Contruction", Journal of Machine Learning Research 8 (2007) 1-33.
Geurts, Pierre, et al., "Extremely randomized trees", Springer Science + Business Media, Inc., rec'd Jun. 14, 2005, pub. online Mar. 2, 2006.
Kamkar, Sean Javad, "Mesh Adaption Strategies for Vortex-Dominated Flows", Standard University, Feb. 2011.
Louppe, Gilles, et al., "Learning to Pivot with Adversarial Networks", 31st Conference on Neural Information Processing Systems (NIPS 2017), Long Beach, CA, USA, https://papers.nips.cc/paper/6699-learning-to-pivot-with-adversarial-networks.pdf.
Lundberg, Scott M., et al., "A Unified Approach to Interpreting Model Predictions", 31st Conference on Neural Information Processing Systems (NIPS 2017), Long Beach, CA, USA, Nov. 25, 2017.
Lundberg, Scott M., et al., "Consistent Individualized Feature Attribution for Tree Ensembles", University of Washington, Mar. 7, 2019.
Merrill, John W. L., et al., "Generalized Integrated Gradients: A practical method for explaining diverse ensembles", Journal of Machine Learning Research Under Review (2019).
Merrill, Douglas C, et al., "Systems and Methods for Decomposition of Non-Differentiable and Differentiable Models", U.S. Appl. No. 16/434,731, filed Jun. 7, 2019.
Merrill, Douglas C, et al., "Systems and Methods for Enriching Modeling Tools and Infrastructure with Semantics", U.S. Appl. No. 16/394,651, filed Apr. 25, 2019.
Modarres, Ceena, et al., "Towards Explainable Deep Learning for Credit Lending: A Case Study", arXiv:1811.06471V2 [cs.LG], Nov. 30, 2018.
Richardson, L. F., "The approximate arithmetical solution by finite differences of physical problems including differential equations, with an application to the stresses in a masonry dam", Philosophical Transactions of the Royal Society A. 210 (459-470): 307-357. doi:10.1098/rsta.1911.0009, Nov. 2, 1909.
Richardson, L. F., "The deferred approach to the limit", Philosophical Transactions of the Royal Society A. 226 (636-646): 299-349. doi:10.1098/rsta.1927.0008, Oct. 14, 1926.
Rumelhart, David E., et al., "Learning representations by back-propagating errors", Nature vol. 323, Oct. 9, 1986.
Saabas, Ando, "Diving into data, A blog on machine learning, data mining and visualization, Interpreting random forests", http://blog.datadive.net/interpreting-random-forests/ (spec), Oct. 19, 2014.
Saabas, Ando, "Diving into data, A blog on machine learning, data mining and visualization, Random forest interpretation—conditional feature contributions", http://blog.datadive.net/random-forest-interpretation-conditional-feature-contributions/ (spec), Oct. 26, 2016.
Saabas, Ando, "Diving into data, A blog on machine learning, data mining and visualization, Random forest interpretation with scikit-learn", http://blog.datadive.net/random-forest-interpretation-with-scikit-learn/ (spec), Aug. 12, 2015.
Shapley, L. S., "A Value For n-Person Games", P-295, The Rand Corporation, Mar. 18, 1952.
Strumbelj, Eric, et al., "An Efficient Explanation of Individual Classifications using Game Theory", Journal of Machine Learning Research 11 (2010) 1-18.
Sundararajan, Mukund, et al., "Axiomatic Attribution for Deep Networks", Proceeding of the 34th International Conference on Machine Learning, Sydney, Australia, PMLR 70, Jun. 13, 2017.
Fonk, Stijn, "Towards fairness in ML with adversarial networks", https://blog.godatadriven.com/fairness-in-ml, Apr. 27, 2019.
Wolpert, David H., "Stacked Generalization", Original contribution: Stacked generalization. Neural Netw., 5(2):241-259, Feb. 1992.
International Search Report and Written Opinion for application No. PCT/US20/062235, dated Mar. 10, 2021.
Office Action (Non-Final Rejection) dated Mar. 2, 2022 for U.S. Appl. No. 16/434,731 (pp. 1-6).
Ward, et al., "An exploration of the influence of path choice in game-theoretic attribuution algorithms," Journal of Machine Learning Research Under Review (2020), 21 pages.
"ZestFinance releases new software tool to reduce bias in AI-powered credit scoring models: New fairness filter can put 170,000 more minority families into homes", Mar. 19, 2019, PR Newswire.
Nesiba, Reynold F., "The Color of Credit: Mortgage Discrimination, Research Methodology, and Fair-Lending Enforcement", Journal of Economic Issues, 37 (3), 813-815, 2003.
Johnson, Kristen, et al., "Artificial Intelligence, Machine Learning, and Bias in Finance: Toward Responsible Innovation", Fordham Law Review, vol. **, Issue 2, Article 5, 2019, pp. 499-529.
Lippert, John, "ZestFinance Issues small, high-rate loans, uses big data to weed out deadbeats", The Washington Post, Oct. 12, 2014.
Tonk, Stijn, "Towards fairness in ML with adversarial networks", http://godatadriven.com/, Apr. 27, 2019.
International Search Report and Written Opinion of the ISA for application No. PCT/20/23370 dated Jun. 18, 2020.
Boris Sharchilev et al: "Finding Influential Training Samples for Gradient Boosted Decision Trees", Arxiv.org, Cornell University Library, 201 Olin Library Cornell University Ithaca, NY 14853, Feb. 19, 2018 (Feb. 19, 2018), XP081223129, 10 pages.
European Extended Search Report issued in EP19764112.9, dated Jun. 27, 2022, 11 pages.
European Extended Search Report issued in EP19764112.9, dated Mar. 24, 2022, 14 pages.
Kang et al., "A novel credit scoring framework for auto loan using an imbalanced-learning-based reject inference". 2019 IEEE Conference on Computational Intelligence for Financial Engineering & Economics (CIFEr). May 4-5, 2019. DOI: 10.1109/CIFEr 2019. 8759110, 8 pages (Year: 2019).
Marco Ancona et al: "Towards better understanding of gradient-based attribution methods for Deep Neural Networks", Arxiv.org, Cornell University Library, 201 Olin Library Cornell University Ithaca, NY 14853, Mar. 7, 2018 (Mar. 7, 2018), XP081506780, 16 pages.
Mukund Sundararajan et al: "Axiomatic Attribution for Deep Networks", Arxiv.org, Cornell University Library, 201 Olin Library Cornell University Ithaca, NY 14853, Mar. 4, 2017 (Mar. 4, 2017), XP080754192, 10 pages.
Office Action (Non-Final Rejection) dated Jun. 24, 2022 for U.S. Appl. No. 17/385,452 (pp. 1-14).
Wikipedia entry on "Autoencoder". https://en.wikipedia.org/wiki/Autoencoder Downloaded Jun. 15, 2022 (Year: 2022).
Bean, D.M., Wu, H., Igbal, E., Dzahini, O., Ibrahim, Z.M., Broadbent, M., Stewart, R. and Dobson, R.J., 2017. Knowledge graph prediction of unknown adverse drug reactions and validation in electronic health records. Scientific reports, 7(1), pp. 1-11.
Office Action (Final Rejection) dated Aug. 16, 2022 for U.S. Appl. No. 15/977,105 (pp. 1-17).
Office Action (Non-Final Rejection) dated Aug. 1, 2022 for U.S. Appl. No. 16/052,293 (pp. 1-15).
Office Action (Non-Final Rejection) dated Aug. 26, 2022 for U.S. Appl. No. 16/394,651 (pp. 1-8).

(56) References Cited

OTHER PUBLICATIONS

Office Action (Non-Final Rejection) dated Sep. 15, 2022 for U.S. Appl. No. 17/535,511 (pp. 1-11).
Office Action (Non-Final Rejection) dated Sep. 22, 2022 for U.S. Appl. No. 17/223,698 (pp. 1-8).
Zhao, Q., Li, Q. and Wen, J., 2018. Construction and application research of knowledge graph in aviation risk field. In MATEC Web of Conferences (vol. 151, p. 05003). EDP Sciences.

* cited by examiner

Algorithm 1 Generalized Integrated Gradients

1: procedure GIG
Require: $f, s, e, D_1, D_2, \ldots, D_n$
Ensure: $\Xi(f, s, e)$
2:     $A \leftarrow \{\alpha_i \in (0,1) : (1-\alpha)s + \alpha e \in \cup_{i=1}^{k} D_i\}$    ▷ Possible internal discontinuities
3:     $\epsilon \leftarrow \frac{1}{2}\min(\frac{\alpha_1}{2}, \frac{\alpha_2 - \alpha_1}{2}, \ldots, \frac{\alpha_{|A|} - \alpha_{|A|-1}}{2}, \frac{1 - \alpha_{|A|}}{2})$
4:     $\delta \leftarrow (1-\epsilon)s + \epsilon e$
5:     $R \leftarrow \{|\{1 \leq j \leq n : (1-\alpha_i)s + \alpha_i e \in D_j\}| : 1 \leq i \leq |A|\}$    ▷ Radices of each discontinuity
6:     for $i \in 1, 2, \ldots, |A|$ do    ▷ Compute contribution of each internal discontinuity
7:        $O_i \leftarrow (1-\alpha_i)s + \alpha_i e$
8:        for $D \in \{-1, 1\}^{R_i}$ do
9:           $\zeta_{i,D} \leftarrow \eta_D f(O_i, d(O_i + \delta D))$    ▷ Uses $D$ as a vector
10:        end for
11:        $\zeta_i \leftarrow \sum_D \zeta_{i,D}$
12:     end for
13:     $\zeta \leftarrow \sum_{i=1}^{|A|} \zeta_i$
14:     $R^0 \leftarrow |\{1 \leq j \leq n : s \in D_j\}|$    ▷ Radix at starting point
15:     if $R^0 > 0$ then
16:        for $D \in \{-1, 1\}^{R_0}$ where $D \neq (-1, -1, \ldots, -1)$ and $D \neq (1, 1, \ldots 1)$ do
17:           $\iota_D^0 \leftarrow \frac{\eta_D}{2} f(s, d(s + \delta D))$
18:        end for
19:        $\iota_0 \leftarrow \eta_{(1,1,\ldots,1)} f(s, d(s + \delta(1, 1, \ldots, 1))) + \sum_D \iota_D^0$    ▷ Starting point contribution
20:        $\iota_0 \leftarrow \iota_0 + \frac{1}{2}(f(s, d(s)) - f(s + \delta(1, 1, \ldots, 1), d(s + \delta(1, 1, \ldots, 1))))$
21:     else
22:        $\iota_0 \leftarrow 0$
23:     end if
24:     $R^1 \leftarrow |\{1 \leq j \leq n : e \in D_j\}|$    ▷ Radix at ending point
25:     if $R^1 > 1$ then
26:        for $D \in \{-1, 1\}^{R_1}$ where $D \neq (-1, -1, \ldots, -1)$ and $D \neq (1, 1, \ldots 1)$ do
27:           $\iota_D^1 \leftarrow \frac{\eta_D}{2} f(s, d(e + \delta D))$
28:        end for
29:        $\iota_1 \leftarrow \eta_{-(1,-1,\ldots,-1)} f(s, d(e + \delta(-1, -1, \ldots, -1))) + \sum_D \iota_D^1$    ▷ Ending point contribution
30:        $\iota_1 \leftarrow \iota_1 - \frac{1}{2}(f(e, d(e)) - f(e + \delta(-1, -1, \ldots, -1), d(s + \delta(-1, -1, \ldots, -1))))$
31:     else
32:        $\iota_1 \leftarrow 0$
33:     end if
34:     $\Xi \leftarrow \iota_0 + \iota_1 + \zeta + \int_{\alpha=0}^{1} \nabla f((1-\alpha)s + \alpha e, d((1-\alpha)s + \alpha e)) d\alpha$
35:     return $\Xi$
36: end procedure

FIGURE 16

SYSTEMS AND METHODS FOR DECOMPOSITION OF DIFFERENTIABLE AND NON-DIFFERENTIABLE MODELS

CROSS-REFERENCE TO RELATED APPLICATIONS

This application claims priority to U.S. Provisional Application No. 62/806,603 filed 15 Feb. 2019, which is incorporated herein in its entirety by this reference.

TECHNICAL FIELD

This disclosure relates generally to the machine learning field, and more specifically to new and useful systems and methods for understanding machine learning models.

BACKGROUND

As complexity of machine learning systems increases, it becomes increasingly difficult to understand why a machine learning model generated a given score, or made a decision based on a variety of inputs. This becomes even more difficult when model inputs are themselves outputs of other models, or when outputs of such model systems are further transformed prior to being used to make a decision.

Thus, there is a need in the machine learning field to create a new and useful machine learning system and method for explaining machine learning models and model-based decisions. The disclosure herein provides such new and useful systems and methods.

BRIEF DESCRIPTION OF THE FIGURES

FIG. 16 is a representation of a method, according to variations.

DESCRIPTION OF EMBODIMENTS

1. Overview

Figure 1:
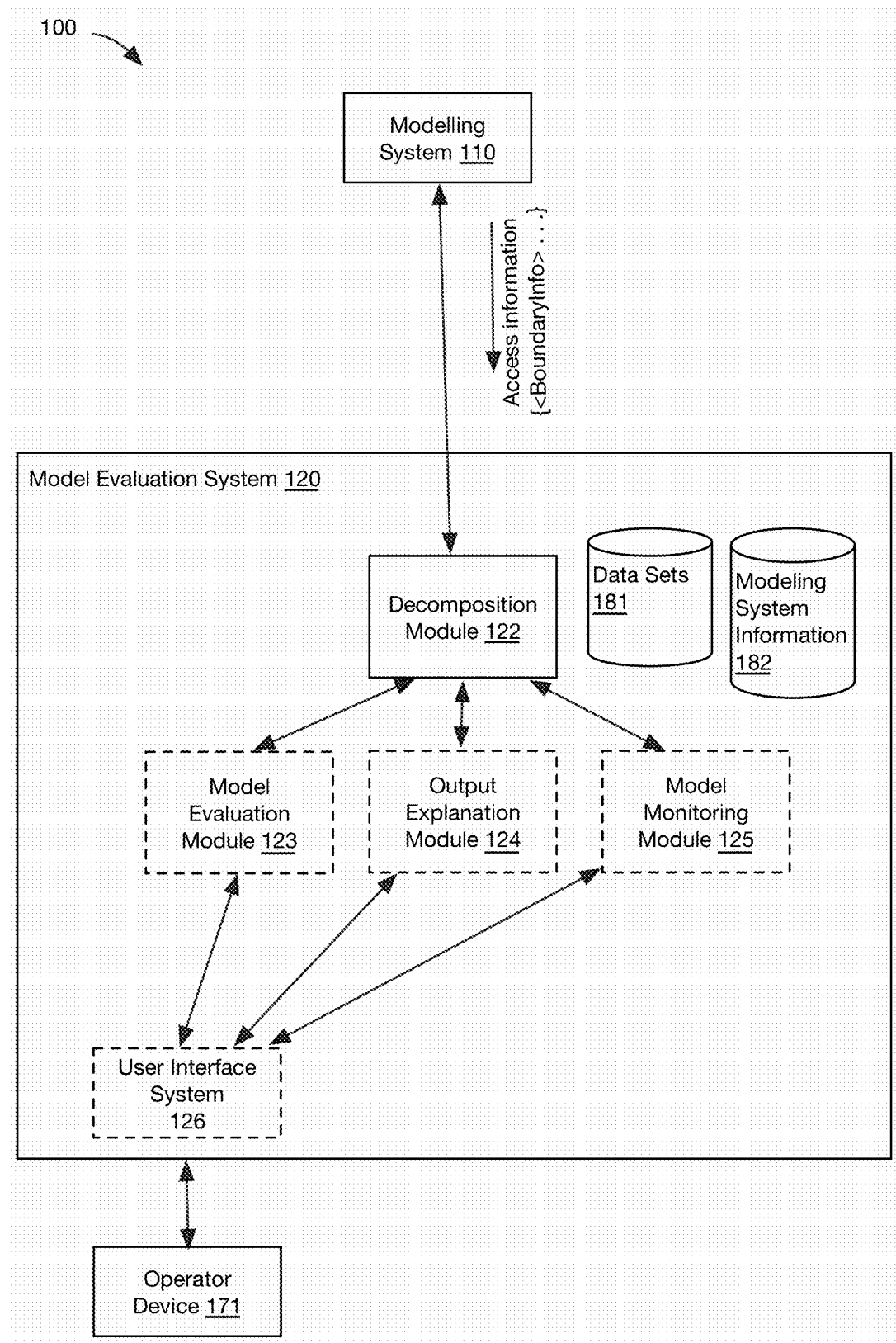
FIG. 1 is a schematic representation of a system, according to variations.

The following description of embodiments is not intended to limit the disclosure to these embodiments, but rather to enable any person skilled in the art to make and use the embodiments disclosed herein.

A machine learning model takes a set of input variables, sometimes numerical, ordinal, continuous-valued, categorical, and the like, and maps those input values to a numeric output. The numerical output can represent a score, a prediction (e.g., a regression prediction, a classification prediction, etc.), and the like. Sometimes the numerical output is passed through a transformation (e.g., a sigmoid transformation, an ECDF transformation, a calibration transformation, etc.) before being used to make a decision based on the model's output (e.g., based on a threshold applied to the model's score, etc.).

For understanding a machine learning model, it is helpful to determine how changes in input values affect the output or outputs of the model. One approach is to select a set of input data sets (e.g., $X=\{x_1, x_1, \ldots, x_n\}$), use the model to generate outputs for each input data set, and identify changes to the outputs across the input data sets. For example, if it is observed that a change in feature $x_1$ results in increased output values, then feature $x_1$ might be understood to have a contribution to output values generated by the model. If this feature relates to an attribute that should not have an impact on model outputs (e.g., the feature relates to an applicant's race, and is used by a credit model to approve loan applications), an alert can be generated to identify possible concerns with the model. If an output generated by the model falls below a threshold, changing a feature might increase an output value generated by the model and cause the model output to exceed a decision threshold. Moreover, the impact of the feature on model outputs generated by the model can be observed over time to help identify changes in operation of the model. Therefore, it is useful to understand the impact that individual features (or groups of features) have on outputs generated by a model.

Machine learning models capture relationships among model inputs to arrive at a model output (e.g., a score for a particular classification or regression target of interest). For example, a fully-connected neural network can consider all combinations of inputs and provide information that can be used to explain how changes in multiple inputs together should influence the model's outputs. A decision tree (or forest, ensemble, etc.) may consider conjunctions and disjunctions of variables and values to arrive at a decision. Model systems may include layers of models and sub-models that determine how much weight each model output should be assigned, given a set of input variables. Moreover a model score may be transformed (e.g., by an ECDF, sigmoid, or other transformation) prior to being used to make a decision (e.g., a decision to deny a credit application, stop a dangerous lane change, make a medical diagnosis, admit an applicant to an educational program, etc.). The disclosure herein describes improved systems and methods for understanding how changes in input values affect the output or outputs of the model or model system, so that the model or model system and the decisions it is used to make, can be understood (e.g., in terms of safety and soundness, fairness, disparate impact, explanation of how outputs were generated, explanation of how model-based decisions were made, comparison with other models, including understanding the relative importance of various input variables and combinations of inputs, by monitoring the operation of the model in production, etc.).

In some variations, the model explanation system is based on a differential credit assignment method such as Aumann-Shapley (described in Aumann & Shapley *Values of Atomic Games,* 1975, Princeton University Press, incorporated herein by reference). In other variations, the model explanation system is based on measure-theoretic methods that extend Aumann-Shapley as described herein. In some variations, the model explanation system produces a specific quantification of the importance of each input variable to a model-based decision, such as, e.g., a decision to deny a credit application. This quantification can be used to power explanations that enable model users to understand why a model made a given decision and what to do to change the model-based decision outcome.

In some variations, the set of input data sets (e.g., $X=\{x_1, x_1, \ldots, x_n\}$) used to understand the model are selected based on a reference input data set, and optionally one or more evaluation input data sets. In some implementations, the reference input data set is generated from a population of data sets. In some implementations, the reference input data set is computed based on specified constraints. In some implementations, the evaluation input data set is generated from a population of data sets. In some implementations, the evaluation input data set is computed based on specified constraints. In some implementations, the evaluation input data set is a data set whose model output is to be understood. In some implementations, the reference data set is the set of all input vectors. In some embodiments, the reference data set is the set of approved applicants, e.g., those applicants who had been previously approved for a loan. In other embodiments, the reference data set is a set of healthy patients, a set of defendants found innocent, a set of signals from sensors indicating a safe lane change, a set of admitted students, etc. In some embodiments, the reference data set is the set of applicants from unprotected groups, such as Non-Hispanic White, men, non-LGBTQ, non-military, or people without disabilities, and the evaluation data set is a set of applicants from protected groups such as African American, Hispanic, Asian, American Indian and Alaskan Natives, Pacific Islander, women, LGBTQ, members of the military, or people with disabilities. In some embodiments, the reference data sets or input data sets are partitioned based on demographic, ethnographic, and psychographic attributions. In some embodiments, the reference data sets or input data sets are partitioned based on a computable indicator function. In some embodiments the systems output a set of reports that enable an operator to review the input variables causing differences in model scores for a plurality of segments based on a model, model system, or model-based decisioning system. In some embodiments the model system is an ensemble of different model types including, without limitation, neural networks, gradient boosted decision trees, rule-based models, linear models etc. In some embodiments the model-based decisioning system is comprised of a model system and a transformation function. In some embodiments the model-based decisioning system is comprised of a model system, a transformation function, and a threshold determining a binary outcome such as approve/deny. In some embodiments the model-based decisioning system includes a partitioning of a continuous value into a countable set of discrete outcomes, such as credit grades (A, B, C, D, etc.), customer types, and other discrete outputs, without limitation.

In some variations, a set of input data sets (e.g., $X=\{x_1, x_1, \ldots, x_n\}$) used to understand the model are selected by determining a path between each element of a reference input data set and each element of an evaluation input data set. In some variations, this path is a straight line path between an element of a reference input data set and an element of an evaluation input data set.

In some variations, for a continuous model, contribution values for each feature of the model can be determined by computing the componentwise integral of the gradient of the output of the model on the path from any element of the reference input data set to any element of an evaluation input data set (integration path), wherein each component of the componentwise integral represents a contribution value for a feature of the input space. For example, for an input with features $\{x_1, x_2, x_3\}$, the componentwise integral includes contribution values $\{c_1, c_2, c_3\}$ which correspond to the feature contribution of features $\{x_1, x_2, x_3\}$, respectively. This technique is known as Aumann-Shapley. The Aumann-Shapley is described in Values of Non-Atomic Games. Robert Aumann, and Lloyd Shapley, 1974, https://press.princeton.edu/books/hardcover/9780691645469/values-of-non-atomic-games, the contents of which is incorporated by reference herein. The Aumann-Shapley technique has been adapted to determine the contribution of each feature to a model's score, as described in Axiomatic Attribution for Deep Networks. Mukund Sundararajan, Ankur Taly, Qiqi Yan, 2017 https://arxiv.org/abs/1703.01365, the contents of which is incorporated by reference herein.

Unfortunately these techniques only apply to continuous models for which the partial derivative (and therefore the gradient, or matrix of partial derivatives) is defined. This limits the utility of the technique to a limited class of predictive models. The present disclosure overcomes this limitation by making use of advanced analysis, specifically, the lesser-known tools of measure theory, pioneered by French mathematicians Borel and Lebesgue. This novel application of advanced mathematical analysis provides a practical method for computing the importance of variables used in complex predictive model systems is described in detail herein. Disclosed herein are methods and systems based on importance values that generate notices to consumers explaining, for example, why they were denied a loan, mortgage, or credit card. Disclosed herein are methods and systems that perform analysis for understanding disparate impact on protected classes, such as a difference in approval rate, pricing or other feature of a loan product and generate comprehensive reports that enable lenders to understand how their model is behaving and document it for risk managers and regulators. This method can also be used for such practical purposes as explaining why a model arrived at a particular medical diagnosis, why a model decided a defendant was guilty, a contract vague, an essay should receive a particular grade, a student should be denied admission, and many more practical and useful applications that produce tangible outputs by implementing the methods in systems described herein, which embody our invention.

For a non-continuous model, there may be points along the path from the reference input data set to the evaluation input data set for which the gradient of the output of the model cannot be determined. For instance, in tree-based models or rule-based models, the predictive function may have jump discontinuities at any tree split or rule antecedent. In some variations, the boundary points along the path correspond to decision tree feature splits. In some variations, the boundary points along the path correspond to rule antecedents. In some variations, the boundary points correspond to decision tree feature splits in a forest of trees. In some variations, the boundary points correspond to threshold values in a Bayesian or system of Bayesian models such as a hierarchical Bayesian model system.

For example, for a tree-based model that represents the expression, "If $x_1>10$ then 5, otherwise if $x_1>20$ then 10, otherwise 0.", this expression identifies two boundary points, namely the points having the following values for feature $x_1$: <10>, <20>.

In some variations, a reference data point and an evaluation data point are received and each boundary point along the path between the two points is identified, and the path is segmented at each identified boundary point. Then, for each segment, contribution values for each feature of the model are determined by computing the componentwise integral of the gradient of the output of the model on the segment. A single contribution value is determined for each boundary point, and this contribution value is assigned to at least one feature. For example, for an input data set that includes three features $\{x_1, x_2, x_3\}$, a single contribution value is determined for the boundary point, and this value is assigned to one or more of the features $\{x_1, x_2, x_3\}$. In some variations, the value is assigned based on an analysis of the contribution within each component participating in the boundary point according to the methods described in Merrill, et al "Generalized Integrated Gradients: A practical method for explaining diverse ensembles" https://arxiv.org/abs/1909.01869, the contents of which are included herein by reference.

In some variations, a contribution value for each feature according to the path is determined by combining the feature's contribution values for each segment, and any boundary point contribution values assigned to the feature. In some implementations, contribution values for a feature are combined by adding. In some implementations, contribution values for a feature are combined by using a combining function. In some implementations, the contribution values for the endpoints are computed using a specific method as described in Merrill, et al., "Generalized Integrated Gradients: A practical method for explaining diverse ensembles".

In some variations the model is a combination of continuous and discrete models, such as an ensemble of the form f(g(x), h(x), x) where x is a vector of input variables, h is a tree-based model, g is a continuous model and f is a continuous ensemble function that considers the outputs of g and h and the inputs x to produce a single prediction. It is obvious that any number of g and h may be combined in this way using arbitrarily deep compositions of ensemble functions like f, each f combining different combinations of submodels like g and h, and a subset of input variables. In this way, multiple diverse model types may be combined and used in combination to create a better prediction. The method disclosed herein is the only method known to the inventors to accurately calculate the contribution of each component of x to the ensemble model score, given such a complex system of diverse model types. The method described herein enables these complex and powerful ensemble models to be used in applications that require transparency and explanations, such as in financial services, where regulation and prudence require model-based decisions be explained to consumers, risk managers, and regulators, in order to prevent harm.

Processes for identifying boundary points along the integration path, determining a contribution value for each boundary point, assigning a boundary point contribution value to a feature, assigning a contribution value at each endpoint of the integration path, and combining the boundary point contributions with the endpoint contributions and the contributions along the segments between the boundary points are disclosed herein.

2. Systems

FIG. 1 is a schematic representation of a system 100, according to variations.

In some variations, a system includes at least one of: a modeling system (e.g., 110) and a model evaluation system (e.g., 120). In some variations, the model evaluation system 120 includes at least one of a decomposition module (e.g., 122), a model evaluation module (e.g., 123), an output explanation module (e.g., 124), a model monitoring module (e.g., 125), and a user interface system 126.

In some variations, the decomposition module 122 functions to determine feature decompositions for outputs of a modeling system in terms of its inputs (e.g., 110).

In some variations, the decomposition module 122 functions to determine feature decompositions for outputs of a modeling system (e.g., 110) by performing a generalized integrated gradients (GIG) process, as described herein. In some implementations, the GIG process includes performing an integrated gradients process to compute the feature contributions on segments of a path or plurality of paths between each element of an evaluation input data set and each element of a reference input data set, wherein the path is segmented at discontinuities of a model that generates the outputs of the modeling system. In some variations the GIG process includes computing the contribution at each discontinuity. In some variations the GIG process includes computing the contributions at the endpoints of the integration path. In some variations the GIG process includes combining the contributions at the endpoints and at each discontinuity with the contributions of each segment along the path between an element of a reference data set and an evaluation data set (the endpoints of the integration path).

In some variations, the model evaluation module 123 functions to generate information based on the influence of features determined by the decomposition module 122. In some variations, the model evaluation module 123 functions to evaluate model fairness based on the influence of features determined by the decomposition module 122. In some variations, the model evaluation module 123 functions to evaluate model output disparities between a data set representative of a first population and a data set representative of a second population, based on the influence of features determined by the decomposition module 122. In some variations, the model evaluation module 123 functions to perform model comparison based on the influence of features determined by the decomposition module 122.

In some variations, the output explanation module 124 functions to generate information based on the influence of features determined by the decomposition module 122. In some variations, the generated information includes output explanation information. In some variations, the generated information includes Adverse Action information. In some variations, the Adverse Action information is comprised of input variables and their contribution to the difference in score between an approved applicant and a denied applicant. In some variations, the Adverse Action information is a summary of the contributions of several grouped input variables, for example, income variables, delinquency variables, indebtedness variables and other variables, without limitation. In some variations the model input variables are based on credit reports, credit attributes, attributes based on data from multiple data sources, some of which may include or be based on credit bureau data, trended attributes, alternative data, public records and the like, and the Adverse Action information includes a summary of the credit attributes that must be improved in order for the applicant to be approved. In some embodiments the Adverse Action information includes reason codes. In some embodiments the reason codes correspond to reason codes consistent with reason codes from a plurality of data sources. In some embodiments the plurality of data sources includes one or more of the data sources used to create input variables for the model.

In some variations, the model monitoring module 125 functions to generate information based on the influence of features determined by the decomposition module 122 so that a model operator may determine whether the model is performing as expected. In some variations, the model monitoring module 125 functions to monitor model operation based on the influence of features determined by the decomposition module 122. In some variations, the model monitoring module 125 functions to monitor model operation based on the decomposition module 122 which it configures using specific sets of reference data points and the model inputs based on data collected over time, such as during model development and model operation. In some variations, the reference data sets used by the model monitoring module 125 are comprised of sub-populations of the applicants, including segments of applicants based on gender, race and ethnicity, military status, LGBTQ status, marital status, age, disabled status and other demographic, ethnographic or psychographic attributes without limitation.

In some variations, the user interface system 126 functions to provide information to at least one operator device (e.g., 171). In some variations, the user interface system 126 functions to provide information generated by at least one of the modules 122-125 to at least one operator device. In some variations, the user interface system 126 functions to provide at least one of a graphical user interface (e.g., a web application, a native application) and an application programming interface (API). In some variations, the user interface system 126 allows an operator to explore the reasons why individual applicants, groups of applicants, segments, were assigned a model output, including a model score, reason code, or model-based decision. In some variations, the user interface system 126 allows an operator to select the segments of applicants or individual applicants for analysis based on an input provided by the operator via the user interface system 126. In some variations, the user interface system 126 functions to provide the user interface to an external system (e.g., 171). In some variations, the user interface system 126 functions to process requests received from an operator device (e.g., 171), process the received requests, and provide responses to the received requests to at least one operator device. In some variations, the user interface system 126 functions to provide data file outputs which are then viewed in an external system (e.g., 171). In some embodiments the external system transforms and loads the data file outputs and outputs are provided to an operator via a data analysis system such as an OLAP system, Data Warehouse system, or analytics tools such as: Microsoft® PowerBI, Tableau®, Microsoft® Excel™, a database, SAP Business Objects®, Salesforce, Oracle BI, Amazon Redshift, SAS and other tools, without limitation.

In some variations, the model evaluation system 120 is communicatively coupled to an operator device 171 (e.g., via one of a private network and a public network).

In some variations, the model evaluation system 120 is communicatively coupled to the modeling system 110 (e.g., via one of a private network and a public network).

In some variations, the model evaluation system 120 is included in the modeling system.

Figure 4:
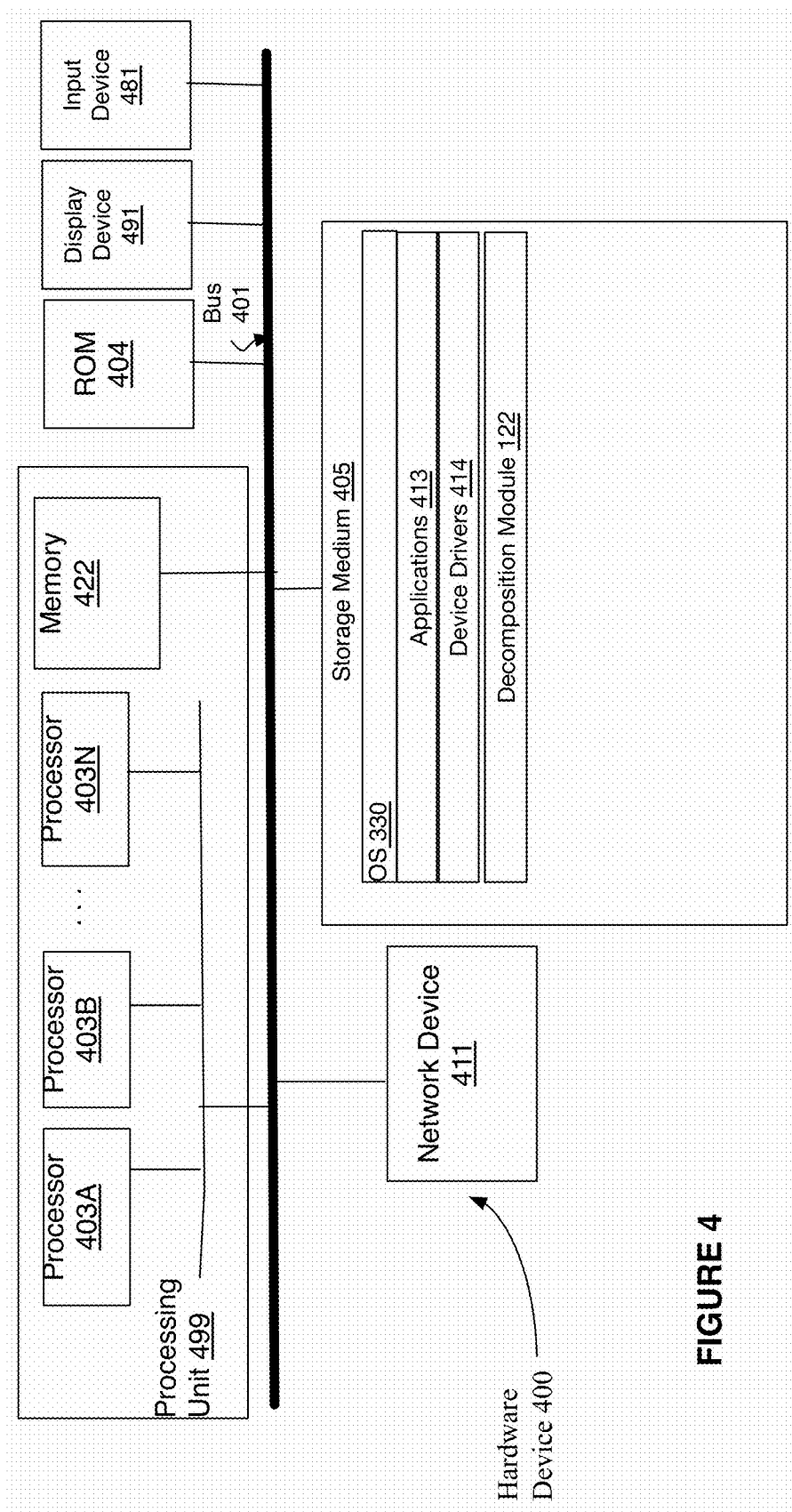
FIG. 4 is a diagram depicting system architecture, according to variations.

In some variations, the system 120 is implemented by one or more hardware devices. FIG. 4 shows a schematic representation of the architecture of an exemplary hardware device 400.

In some variations, a hardware device implementing the system 120 includes a bus 401 that interfaces with the processors 403A-N, the main memory 422 (e.g., a random access memory (RAM)), a read only memory (ROM) 404, a processor-readable storage medium 405, and a network device 411. In some variations, bus 401 interfaces with at least one of a display device 491 and a user input device 481.

In some variations, the processors 403A-403N include one or more of an ARM processor, an X86 processor, a GPU (Graphics Processing Unit), a tensor processing unit (TPU), and the like. In some variations, at least one of the processors includes at least one arithmetic logic unit (ALU) that supports a SIMD (Single Instruction Multiple Data) system that provides native support for multiply and accumulate operations.

In some variations, at least one of a central processing unit (processor), a GPU, and a multi-processor unit (MPU) is included.

In some variations, the processors and the main memory form a processing unit 499. In some variations, the processing unit includes one or more processors communicatively coupled to one or more of a RAM, ROM, and machine-readable storage medium; the one or more processors of the processing unit receive instructions stored by the one or more of a RAM, ROM, and machine-readable storage medium via a bus; and the one or more processors execute the received instructions. In some variations, the processing unit is an ASIC (Application-Specific Integrated Circuit). In some variations, the processing unit is a SoC (System-on-Chip).

In some variations, the processing unit includes at least one arithmetic logic unit (ALU) that supports a SIMD (Single Instruction Multiple Data) system that provides native support for multiply and accumulate operations. In some variations the processing unit is a Central Processing Unit such as an Intel processor.

In some variations, the network device 411 provides one or more wired or wireless interfaces for exchanging data and commands. Such wired and wireless interfaces include, for example, a universal serial bus (USB) interface, Bluetooth interface, Wi-Fi interface, Ethernet interface, near field communication (NFC) interface, and the like.

Machine-executable instructions in software programs (such as an operating system, application programs, and device drivers) are loaded into the memory (of the processing unit) from the processor-readable storage medium, the ROM or any other storage location. During execution of these software programs, the respective machine-executable instructions are accessed by at least one of processors (of the processing unit) via the bus, and then executed by at least one of processors. Data used by the software programs are also stored in the memory, and such data is accessed by at least one of processors during execution of the machine-executable instructions of the software programs. The processor-readable storage medium is one of (or a combination of two or more of) a hard drive, a flash drive, a DVD, a CD, an optical disk, a floppy disk, a flash storage, a solid state drive, a ROM, an EEPROM, an electronic circuit, a semiconductor memory device, and the like.

In some variations, the processor-readable storage medium 405 includes machine executable instructions for at least one of the decomposition module 122, the model evaluation module 123, the output explanation module 124, the model monitoring module 125, and the user interface system 126. In some variations, the processor-readable storage medium 405 includes at least one of data sets (e.g., 181) (e.g., input data sets, evaluation input data sets, reference input data sets), and modeling system information (e.g., 182) (e.g., access information, boundary information).

In some variations, the processor-readable storage medium 405 includes machine executable instructions, that when executed by the processing unit 499, control the device 400 to perform at least a portion of the method 200.

Figure 2:
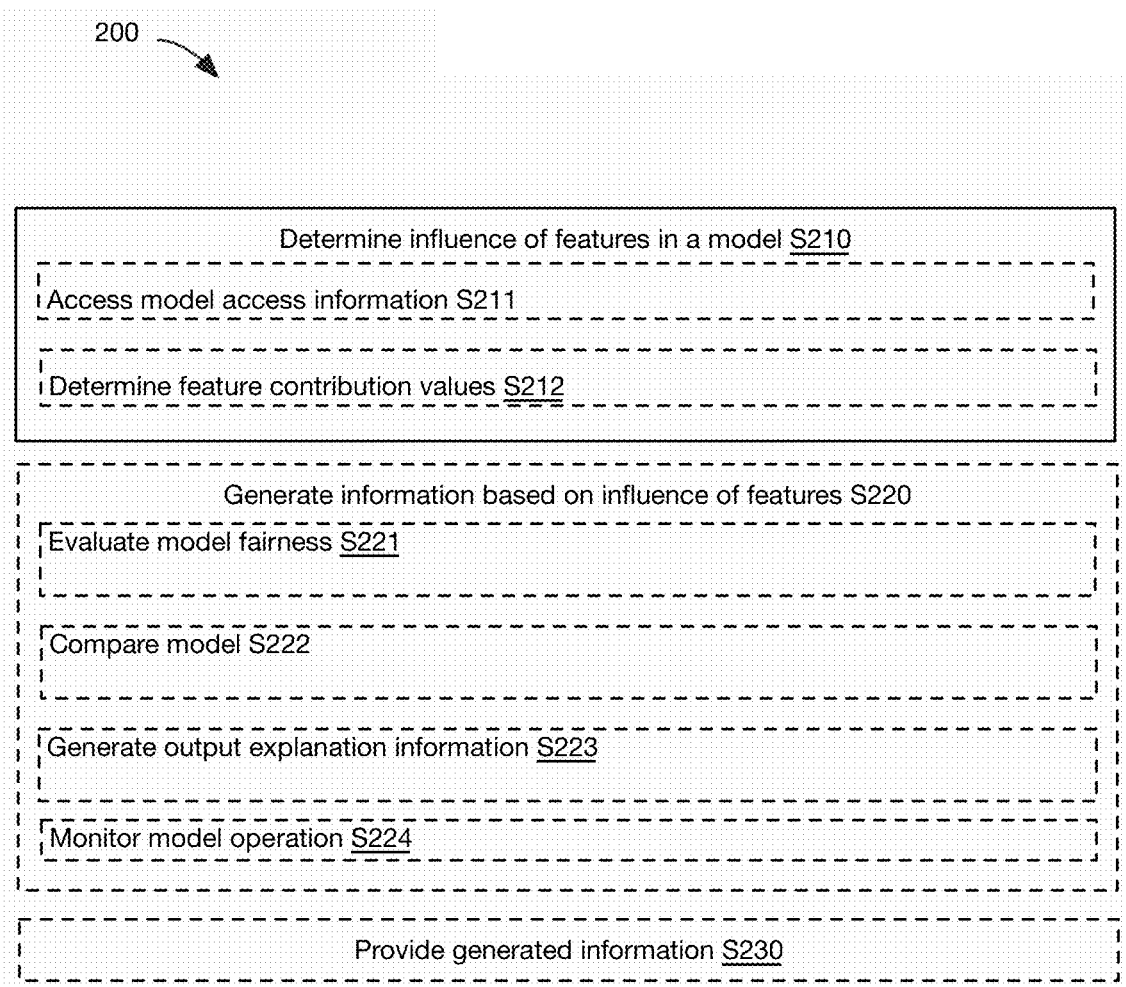
FIG. 2 is a representation of a method, according to variations.

3. Methods:

As shown in FIG. 2, a method 200 includes at least one of: determining influence of features in a model (S210); generating information based on influence of features (S220); and providing generated information (S230).

In some variations, the model evaluation system 120 performs at least a portion of the method 200. In some variations, at least one component of the model evaluation system 120 performs at least a portion of the method 200.

In some implementations, a cloud-based system performs at least a portion of the method 200. In some implementations, a local device performs at least a portion of the method 200.

S210 can include at least one of S211 and S212 shown in FIG. 2.

S211 functions to access model access information for a model (e.g., a model of the modeling system 110). The model can be any type of model, including, without limitation, a continuous model, a non-continuous model, an ensemble, and the like. In some variations, model access information includes information identifying at least one of: at least one tree structure of the model; discontinuities of the model; decision boundary points of the model; values for decision boundary points of the model; features associated with boundary point values; an ensemble function of the model; a gradient operator of the model; gradient values of the model; information for accessing gradient values of the model; transformations applied to model scores that enable model-based outputs; information for accessing model scores and model-based outputs based on inputs.

In some embodiments, the model is a credit risk model. In some embodiments, the model is a fraud model. In some embodiments the model is a financial crimes model, including, without limitation, an anti-money laundering model. In some embodiments the model is a marketing model, including, without limitation, an online marketing model, a direct mail marketing model, or a marketing mix model. In some embodiments, the model is an advertising model, personalization model, affinity model, or recommendation model. In some embodiments, the model is a collections model. In some embodiments, the model is an account management, next best offer, or profit/loss prediction model. In some embodiments, the model predicts capital at risk in order to comply with BASEL, or CCAR. In some embodiments, the model is a financial results forecasting model. In some embodiments, the model is a price prediction model. In some embodiments, the model is a financial portfolio model. In some embodiments, the model is an inventory forecasting model, workforce management model, same store sales model, foot traffic model, category management model, LTV prediction model, customer acquisition cost model, and the like.

In some variations, S211 includes the model evaluation system 120 accessing the model access information from the modeling system (e.g., 110) (e.g., via one or more remote procedure calls, one or more local procedure calls, an API of the modeling system, an API of the model evaluation system). In some variations, the model evaluation system 120 accesses the model access information from a storage device (e.g., 182). In some variations, the model evaluation system and the model are co-located in the same process. In some variations, the model evaluation system and the model are represented as machine instructions on a hardware device such as an ASIC, GPU or FPGA.

In some variations, the model is a discontinuous model, such as a decision tree, random forest, or gradient boosted tree, or rule set, and the access information includes information identifying decision boundary points for the model (e.g., BoundaryInfo shown in FIG. 1).

S212 functions to determine feature contribution values for at least one feature used by the model. FIG. 16 shows a process for determining feature contribution values.

In some variations, feature contribution values determined at S212 are used to automatically generate documentation for the modeling system 110. In some variations, feature contribution values determined at S212 are used to automatically generate documentation by performing a method described in U.S. patent application Ser. No. 16/394,651 ("SYSTEMS AND METHODS FOR ENRICHING MODELING TOOLS AND INFRASTRUCTURE WITH SEMANTICS"), filed 25 Apr. 2019, the contents of which is incorporated herein. However, in some variations, documentation can be automatically generated from feature contribution values by performing any suitable process.

Figure 3:
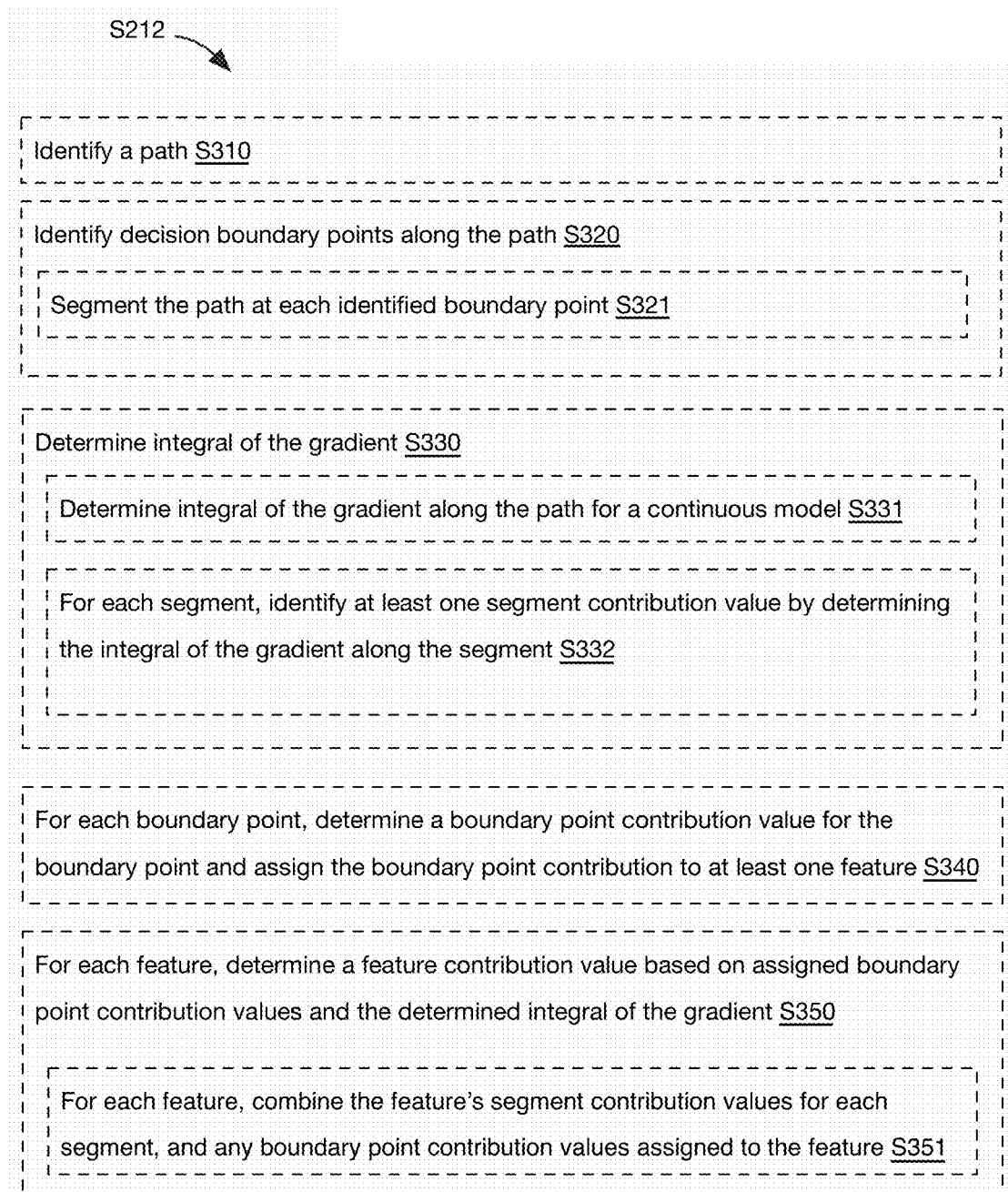
FIG. 3 is a representation of a method, according to variations.

S212 can include at least one of S310, S320, S330, S340 and S350 shown in FIG. 3.

In some variations, S310 functions to identify a path between a reference input data set (point) and an evaluation input data set (point). In some variations, this path is a straight line path.

In some variations, S310 includes selecting the reference input data set. In some variations, S310 includes selecting the evaluation input data set. In some variations, at least one of the reference input data set and the evaluation input data set is selected based on user input received via an operator device (e.g., 171). In some variations, at least one of the reference input data set and the evaluation input data set is selected by at least one of the model evaluation module 123, the output explanation module 124, and the model monitoring module 125. In some variations, the evaluation module 123 selects a reference input data set (e.g., representative of a general population) used to evaluate model fairness. In some variations, the evaluation module 123 selects an evaluation input data set (e.g., a protected class population) used to evaluate model fairness. In some variations, the output explanation module 124 selects a reference input data set (e.g., representing a barely acceptable credit applicant) used to explain an output generated by the model for a selected evaluation input data set (the evaluation input data set being the data set used by the model to generate the output being explained). In some variations, the output explanation module 124 selects a reference input data set or an evaluation data set based on a computable function. In some variations the function is a machine learning model. In some variations the reference input data set or evaluation data set are selected based on an estimation method of determining race and ethnicity, gender and other demographic, psychographic, or ethnographic attributes. In some variations the estimation method is the BISG method, e.g., described in Using publicly available information to proxy for unidentified race and ethnicity. CFPB, 2014 https://files.consumerfinance.gov/f/201409_cfpb_report_proxy-methodology.pdf, the contents of which is incorporated by reference herein.

In some variations the reference data set or evaluation data sets are selected based on self-reported information. In some variations the data sets are computed based on data stored in a database. In some variations the data sets are computed based on census information, data collected by the American Community Survey, a poll, public records, government records, telecommunications records, financial data, facial recognition software, ATM video feeds, surveillance camera feeds, satellite imagery, library records, biometric sensors, DHS and USCIS records, bank records, or other data sets, data sources, and data collection methods without limitation.

S320 functions to identify decision boundary points along the path identified at S310.

In some variations, S320 includes S321, which functions to segment the path identified at S310 at each boundary point, resulting in at least two path segments.

In some variations, identifying decision boundary points along the path includes accessing information about a tree structure of the model. In some variations, the tree structure information identifies the following for each node of the tree structure: a feature or plurality of features being compared at the node (or for a leaf node, the feature being compared in the leaf node's parent); for each non-leaf node, one or more threshold values that are compared with one or more features identified in the node, to select a child node; for each leaf node, the value of the leaf node; a left child node (NULL for a leaf node); and a right child node (NULL for a leaf node).

In some variations, S320 includes performing a boundary point process for finding the points along the path (values of α) corresponding to discontinuities produced by a decision tree's outputs along that path.

In some implementations, S320 includes performing a process as follows. First compute a boundary map comprising the splits for each variable with respect to the tree. In some embodiments, the boundary map is computed based on a depth-first traversal of the decision tree, wherein for each node, for each variable and threshold value encoded at that node, a map from variable to threshold value is accumulated. Once the tree (forest, or other system of rules which can be so encoded) has been fully traversed, each array of threshold values corresponding to each variable is sorted from least to greatest, and in some embodiments, further eliminating duplicates. Second, given any pair of input values, a line segment is defined, which is parameterized by a value α in [0,1]. In some embodiments the line segment is parameterized by a value α according to a linear function, or other computable function, without restriction. In some embodiments, for each input feature, the values of α corresponding to boundaries captured in the map calculated above are computed, such that each boundary is represented at least once in that set. In some embodiments the values of α are computed by solving for the value of each variable corresponding the boundaries in the map. So, for example, if a variable x has a boundary at 2 the method solves for the value of α corresponding to x=2. In some embodiments, the parameterization is linear, in which case, the solution for the value of α is the result of solving a single linear equation in one unknown. For example let the predictive function be f(x)=0 if x<2 and 2 if x>=2; let the pair of inputs be 1 and 4. If the parameterization of the line segment between 1 and 4 is given by f(α)=(1−α)*1+α*4. Then the value of α corresponding to the boundary is ⅓. In some embodiments, the values of α corresponding to all possible boundaries for each variable are extracted. In some embodiments, the values of α corresponding to only some of the boundaries are extracted, in order to reduce the number of computations. In some embodiments, a vector of α is aggregated to represent all the boundary points encountered along the path. In some embodiments the aggregation function is a set union. In other embodiments the aggregation function is a frequency map.

In some implementations, S320 includes identifying decision boundary points as shown in FIG. 16 at lines 2 to 5. As shown in FIG. 16, f is a piecewise continuous function, s is the start point of the path identified at S310, e is the end point of the path identified at S310, and D are points along the path identified at S310.

S330 functions to determine an integral of a gradient of the model along an integration path. If no decision boundary points are identified at S320, then the model is continuous along the path identified at S310, and S330 includes determining an integral of the gradient of the model along the path identified at S310 (process S331). If at least one decision boundary point is identified at S320, then the model is not continuous along the path identified at S310, and S330 includes: for each segment identified at S321, determining an integral of the gradient of the model along the segment (process S332).

S340 functions to determine a contribution value for each boundary point determined at S320, and assign each determined contribution to at least one feature. In some implementations, S340 includes determining a contribution value for each boundary point as shown in FIG. 16 at lines 6 to 13.

In some embodiments, S340 determines a contribution value for each variable at the endpoints of the integration segment. In some embodiments, S340 determines a contribution value for a variable at the starting point of the integration segment as shown in FIG. 16 at lines 13-23. In some embodiments, S340 determines a contribution value for a variable at the ending point of the integration segment as shown in FIG. 16 at lines 24-32.

S350 functions to determine a feature contribution value for each feature based on any boundary values assigned at S340 and integrals determined at S330.

In some variations, S350 includes: for each feature, combining the feature's contribution values for each segment and any boundary contribution values assigned to the feature (S351). In some implementations, contribution values for a feature are combined by adding. In some implementations, contribution values for a feature are combined by using a combining function.

In some embodiments, S350 functions to determine a feature contribution value for each feature based on any boundary values assigned at S340 and integrals determined at S330 as shown in FIG. 16 at line 34.

Returning to FIG. 2, S220 functions to generate information based on the influence of features on operation of the model. In some variations, the information is generated based on feature contribution values generated at S212.

S220 can include at least one of S221, S222, S223, and S224. In some variations, the decomposition module 122 performs at least a portion of at least one of S221-S224. In some variations, the model evaluation module 123 performs at least a portion of S221. In some variations, the model evaluation module 123 performs at least a portion of S222. In some variations, the output explanation module 124 performs at least a portion of S223. In some variations, the model monitoring module 124 performs at least a portion of S224.

S221 functions to determine model fairness based on influence of features on operation of the model. In some variations, S221 functions to determine model fairness based decomposition by performing a method described in U.S. Provisional Patent Application No. U.S. Application No. 62/820,147 ("SYSTEMS AND METHODS FOR MODEL FAIRNESS"), filed 18 Mar. 2019, the contents of which is incorporated herein.

In some variations, S222 functions to compare the model (first model) to another model (second model) based on influence of features on operation of the first model and influence of features on operation of the second model. In some variations, S222 functions to compare the model (first model) to another model (second model) based on decompositions by performing a method described in U.S. patent application Ser. No. 16/394,651 ("SYSTEMS AND METHODS FOR ENRICHING MODELING TOOLS AND INFRASTRUCTURE WITH SEMANTICS"), filed 25 Apr. 2019, the contents of which is incorporated herein.

In some variations, S222 functions to compare operation of the model with a first set of input data (e.g., data for a first time period) with operation of the model with a second set of input data (e.g., data for a second time period), based on influence of features on operation of the model for the first set of input data and influence of features on operation of the model for the second set of input data. In some variations, S222 functions to compare operation of the model with a first set of input data (e.g., data for a first time period) with operation of the model with a second set of input data (e.g., data for a second time period), based on decompositions by performing a method described in U.S. patent application Ser. No. 16/394,651 ("SYSTEMS AND METHODS FOR ENRICHING MODELING TOOLS AND INFRASTRUCTURE WITH SEMANTICS"), filed 25 Apr. 2019, the contents of which is incorporated herein.

S223 functions to generate output explanation information for an output generated by the model. In some variations, the output explanation information includes adverse action information as required by the Fair Credit Reporting Act of 1970. In some variations, S223 functions to generate output explanation information for an output generated by the model by performing a method described in U.S. Provisional Patent Application No. 62/641,176, filed 9 Mar. 2018, entitled "SYSTEMS AND METHODS FOR PROVIDING MACHINE LEARNING MODEL EXPLAINABILITY INFORMATION BY USING DECOMPOSITION", by Douglas C. Merrill et al, the contents of which is incorporated herein. In some variations, S223 functions to generate output explanation information for an output generated by the model by performing a method described in U.S. Provisional Patent Application No. 62/806,603 ("SYSTEMS AND METHODS FOR DECOMPOSITION OF DIFFERENTIABLE AND NON-DIFFERENTIABLE MODELS"), filed 15 Feb. 2019, the contents of which is incorporated by reference. In some variations, S223 functions to generate output explanation information for an output generated by the model by performing a method described in U.S. Provisional Patent Application No. U.S. Application No. 62/820,147 ("SYSTEMS AND METHODS FOR MODEL FAIRNESS"), filed 18 Mar. 2019, the contents of which is incorporated herein S224 functions to monitor model operation of the model. In some variations, S224 includes detecting at least one of feature drift, unexpected inputs, unexpected outputs, unexpected explanations, population stability, and the like. In some variations S224 analyzes model feature contributions based on the GIG method and monitors model operations based on comparing distributions of feature contributions based on model inputs and scores selected from data captured during model operation in production, using the GIG method. In some variations, S224 includes providing an alert to at least one system (e.g., 171) in response to detecting at least one of feature drift, unexpected inputs, unexpected outputs, population stability, and the like. S224 functions to monitor model operation of the model by performing a method described in U.S. patent application Ser. No. 16/394, 651 ("SYSTEMS AND METHODS FOR ENRICHING MODELING TOOLS AND INFRASTRUCTURE WITH SEMANTICS"), filed 25 Apr. 2019, the contents of which is incorporated herein.

S230 functions to provide information generated at S220 to at least one system (e.g., operator device 171). In some variations, S230 functions to store information generated at S220 in a knowledge graph which is used to generate informative reports, outputs, user interfaces, applications, and consumer notices.

Returning to S320, the decision boundary points are the set of vectors in the input space for which there is a discontinuity in the resulting model score. In some variations the decision boundary points are determined by first retrieving the discontinuous model, recursively traversing the tree or trees in the model, and enumerating the splits at each decision node in each tree. In forest models, there are multiple trees which contain multiple decision boundaries. In these cases, the method first enumerates the decision boundaries in each tree, iteratively, and then computes the union set of all decision boundaries in the input space. For example, a simple tree-based model might represent the expression, "If A>10 then 5, otherwise if A>20 then 10, otherwise 0." The decision boundaries for this tree-based model would be an input data set (within the input space) having the value <10> for feature "A" and an input data set (within the input space) having the value <20> for feature "A". In some variations, a forest model might consist of two trees, the first of which might represent the expression, "If A>10 then 5, otherwise 0," and the second of which might represent the expression, "If A>20 then 10, otherwise 0." The decision boundaries for this simple forest-based model computed using this method would be an input data set (within the input space) having the value <10> for feature "A" and an input data set (within the input space) having the value <20> for feature "A".

In some variations, S320 (identify decision boundary points) includes extracting the decision boundaries by exhaustive search of the input space. In some variations, S320 includes extracting the decision boundaries by using methods built into a modeling package of the modeling system 110 (for example by directly accessing the tree structure and traversing it using a method such as depth-first search). In some variations, S320 includes extracting the decision boundaries by first exporting the model (e.g., of the system 110) into a text-based format, such as JSON, XML, GraphML, Lisp lists, etc., parsing the text-based format, storing the text-based format in a dictionary data structure held in memory, on disk, or in a database, or other suitable storage medium, and then traversing that data structure to compute the union set of decision boundaries.

In some variations, the model is an ensemble model, and the model access information (accessed at S211) includes information identifying decision boundary points for each discontinuous sub-model of the modeling system (e.g., BoundaryInfo shown in FIG. 1).

In some variations, it is desired to understand the distance between a reference point $x'$ and an input vector $x$. The reference point may represent the 'average' input e.g., the centroid of all input vectors $x_i$. The reference point may represent the 'barely approved' applicant, e.g., the centroid of all input vectors $x_i$ s.t. the score s produced by a model $m(x_i)$ is within epsilon of a threshold $\Theta$ in the range of m.

In some variations the method 200 includes computing the average distance between a set of reference points $x'_i$ and a set of inputs $x_i$ in order to compute the differences between segments or populations, for example, as required in applications such as analysis for model compliance with the Equal Credit Opportunity Act of 1974. In some variations the populations are determined by assigning demographic, ethnographic, psychographic, and other attributes based on a model. In some variations, the race and ethnicity of an applicant is assigned using BISG. In some variations, FICO score ranges are used to segment the population of applicants prior to performing analysis. In some variations, a plurality of pre-configured and tunable segmentation methods are used to provide average feature importances by segment.

Figure 5:
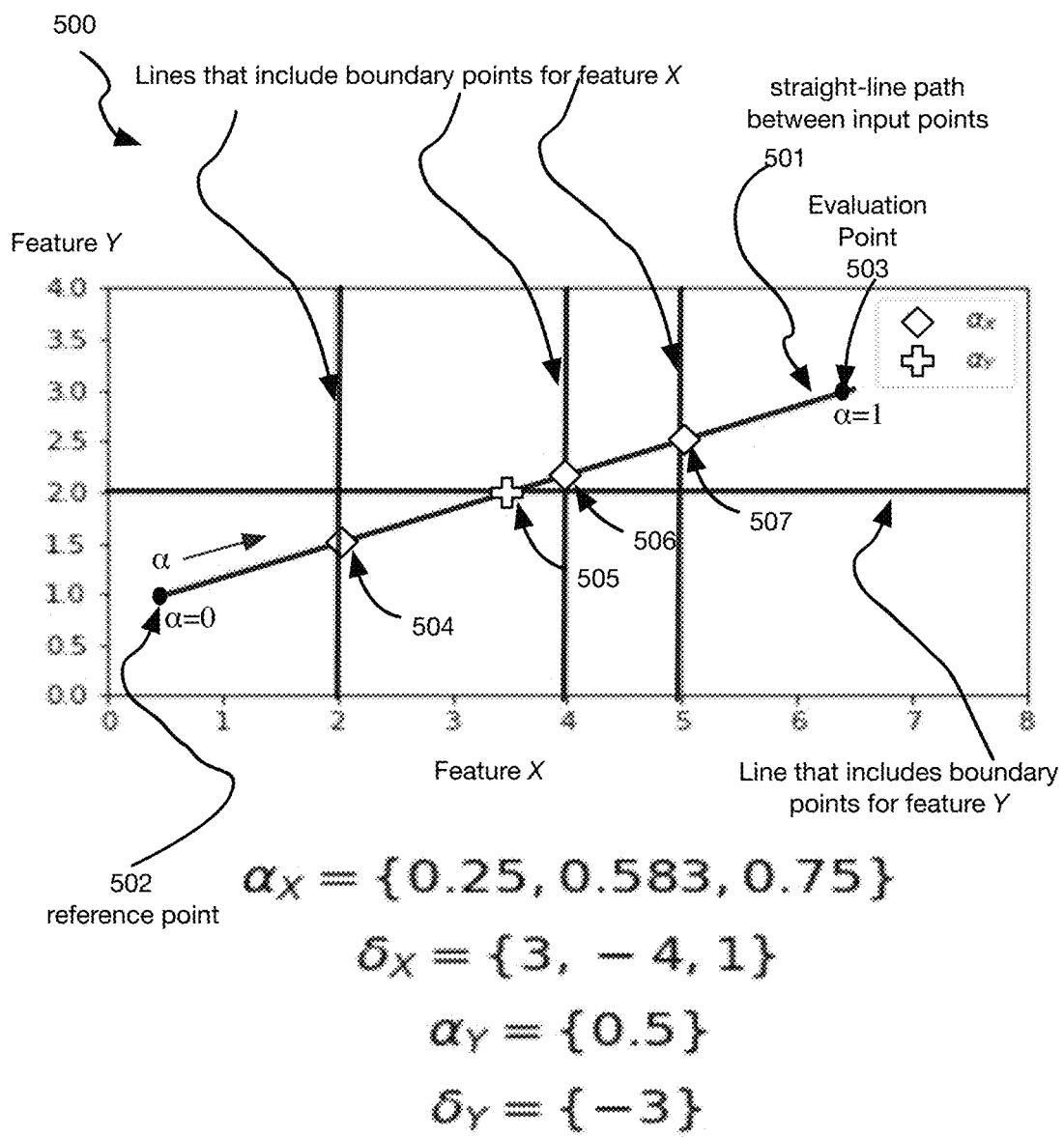
FIG. 5 is a diagram depicting an exemplary input space and boundary points, according to variations.
Figure 6:
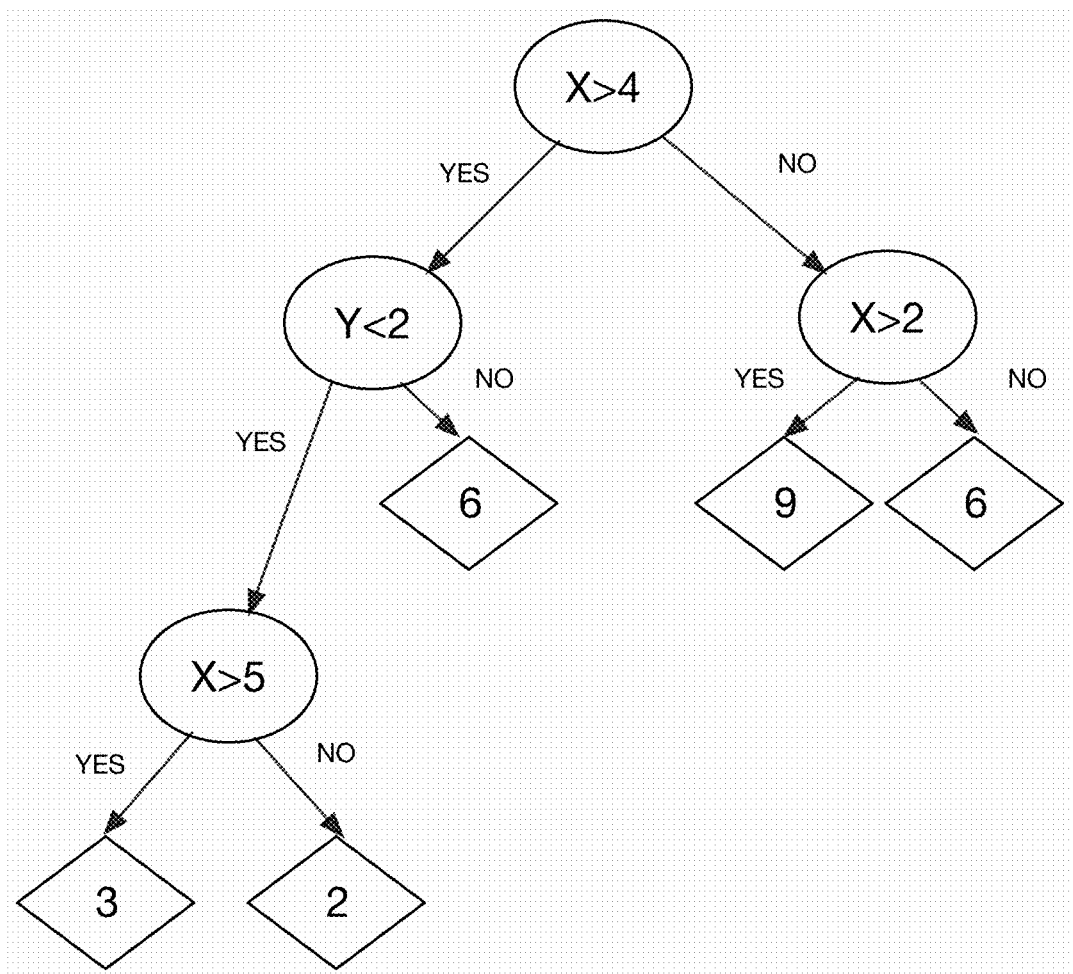
FIG. 6 is a diagram depicting an exemplary tree model, according to variations.

In some variations, each decision boundary point is a point in the input space that is compared with a value for a feature i. Logical expressions may be represented as trees (and vice-versa), and these notations can be used interchangeably. For example, in a tree model representing the expression "if X>2, then 9, else 6", a boundary point is a point (input data set) in the input space (e.g., line 501 shown in FIG. 5) of the model that has a value of X=2 for feature X. To see this, consider all values of X>2, which have a model value of 9 and all values<=2 which have a model value of 6. And so, in this example, 2 is the boundary point. FIG. 6 depicts an exemplary tree model structure. As shown in FIG. 5, the line 501 is a straight line path between a point 502 (e.g., a reference input data set) in the input space and a point 503 (e.g., an evaluation input data set) in the input space. Points 504-507 are boundary points (input data sets) of the model (or sub-model) that are included within the straight line path 501 between the point 502 in the input space and the point 503 in the input space. As shown in FIG. 5, point 504 corresponds to the decision boundary X=2 of the tree structure shown in FIG. 6, point 505 corresponds to the decision boundary Y=2 of the tree structure shown in FIG. 6, point 506 corresponds to the decision boundary X=4 of the tree structure shown in FIG. 6, and point 507 corresponds to the decision boundary X=5 of the tree structure shown in FIG. 6. As shown in FIG. 5, the line 501 is parallel to the $\alpha$ axis, and the $\alpha$ values for the boundary points (for the model $f(x,y,d)=d\sin(X+Y)$) that are related to feature X are 0.25, 0.583, and 0.75. The contribution values (change in output) for the boundary points related to feature X are 3, −4, and 1 (respectively). Similarly, (as shown in FIG. 5) the $\alpha$ values for the boundary points related to feature Y are only 0.5, and the contribution value (change in output) for this boundary point related to feature Y is −3. The values d for the model are determined by the tree structure shown in FIG. 6.

In what follows, the variable against which a comparison is being made at a given boundary value shall be referred to as the "variable corresponding to that boundary value."

Figure 7:
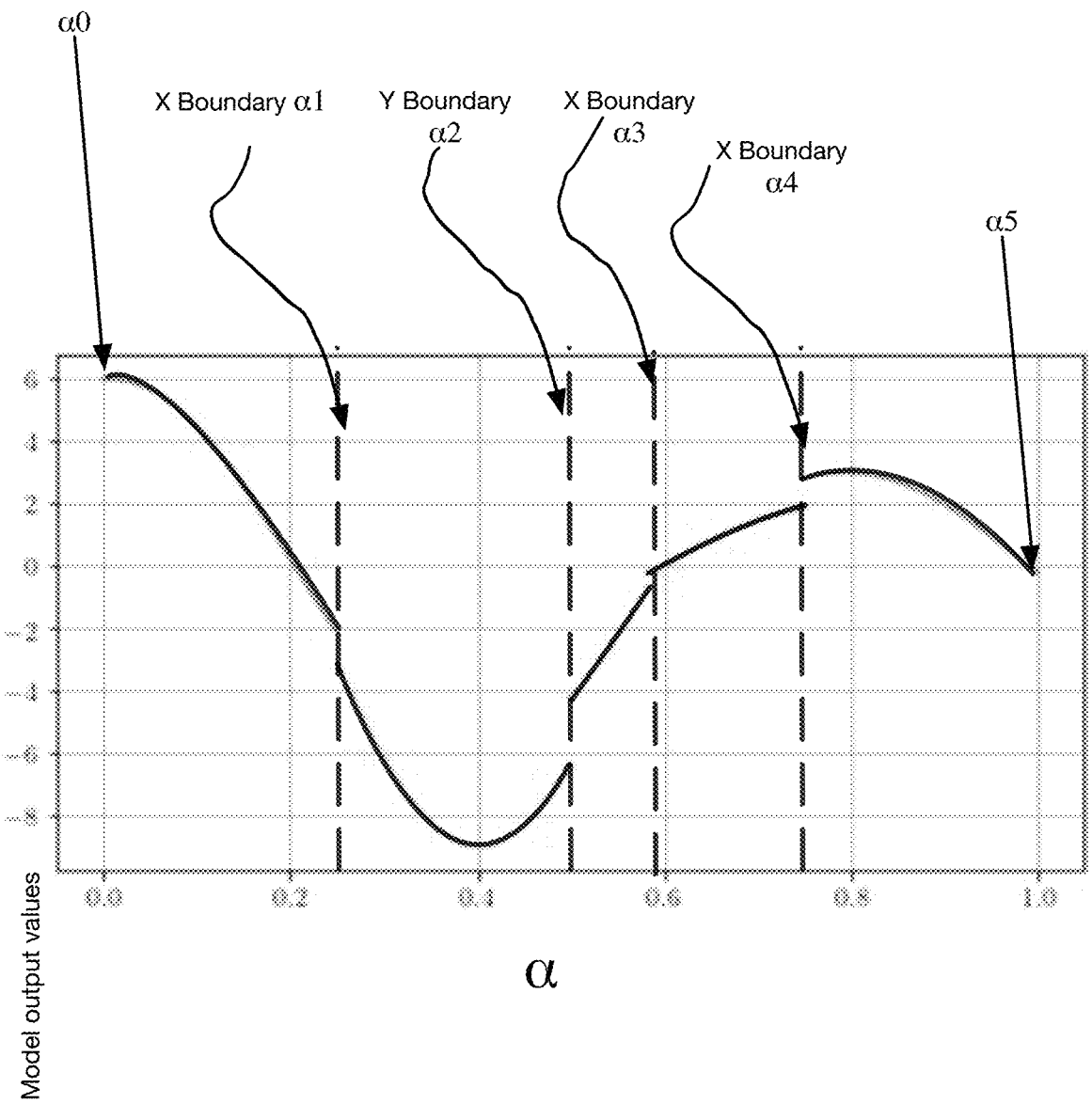
FIG. 7 is a diagram depicting an exemplary integration path and boundary points, according to variations.

FIG. 7 depicts output values of a model f, $f(x, y, d(x, y))=d(x, y)\sin(x+y)$ along the straight line path (e.g., line 501 shown in FIG. 5) from the reference point 502 shown in FIG. 5 to the evaluation point 503 shown in FIG. 5; wherein x, and y are features of the input space, and $d(x,y)$ is a piecewise constant function computed by the decision tree of FIG. 6 based on features x and y, and sin is the continuous transcendental function commonly known in mathematics. In variations, sin may be replaced by any continuous function, such as a linear model, a neural network, a radial basis function, a gaussian mixture, a polynomial, a spline, and indeed any continuous function on $\mathbb{R}^n$, or on any convex subset thereof. As shown in FIG. 7, the discontinuities correspond to the boundary points 504-507 shown in FIG. 5.

Figure 8:
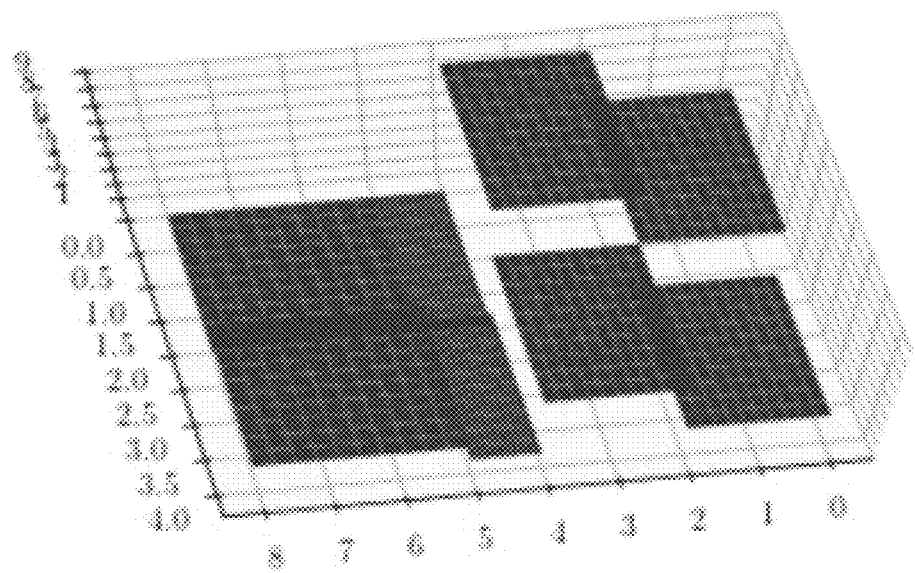
FIG. 8 is a diagram depicting an exemplary input space, according to variations.
Figure 9:
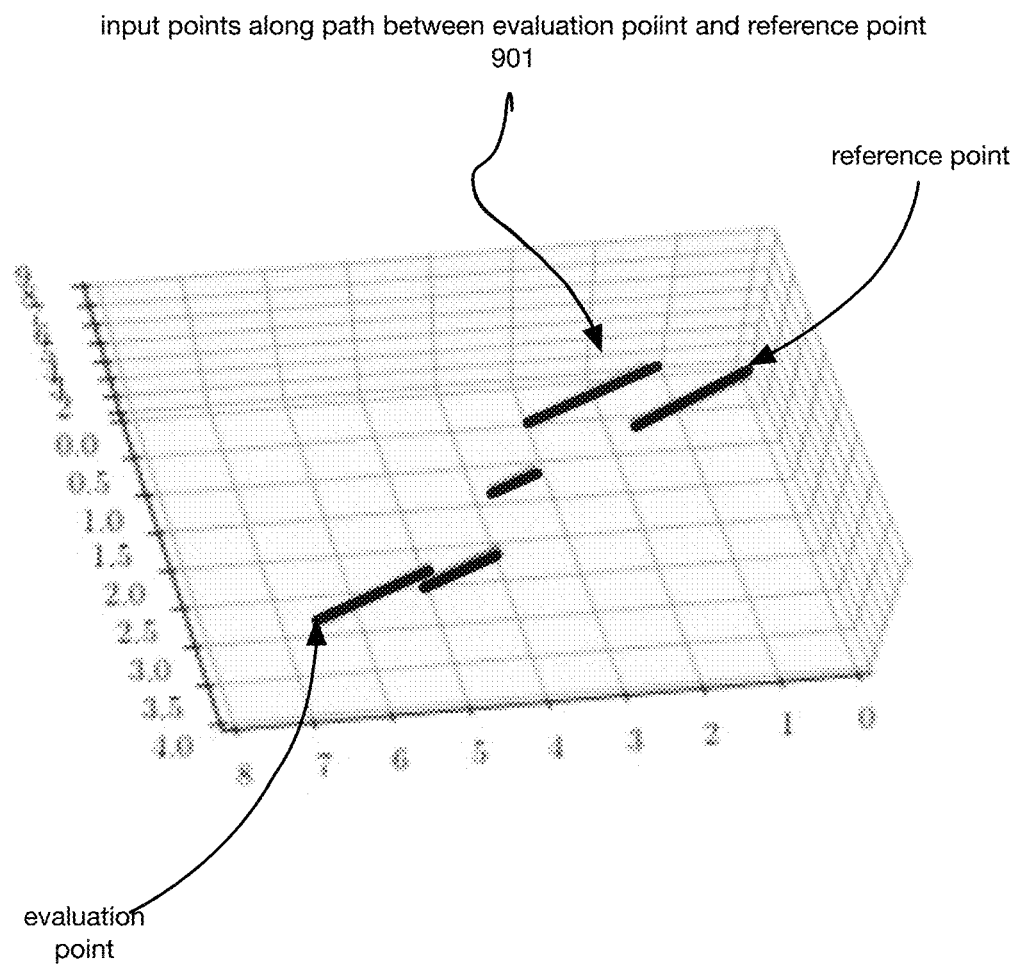
FIG. 9 is a diagram depicting an exemplary input space, according to variations.
Figure 10:
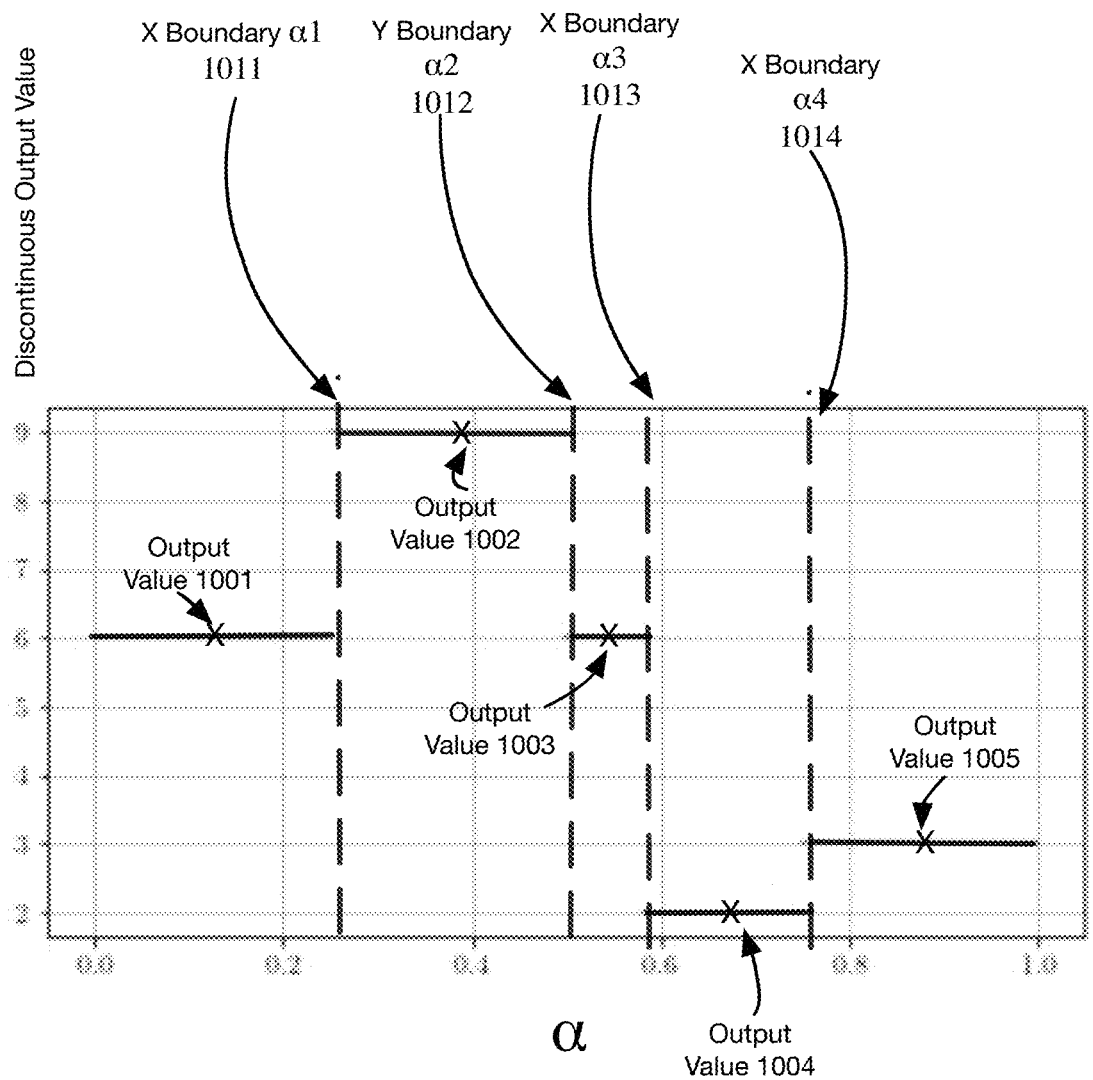
FIG. 10 is a diagram depicting an exemplary integration path and boundary points, according to variations.

In some implementations, let P be the function P: $[0,1]\to\mathbb{R}^n$, s.t. $P(\alpha)=(1-\alpha)x_1+\alpha x_2$ and $\alpha \in [0,1]$, the straight line path (e.g., 501 shown in FIG. 5) wherein the boundary steps are the values $\alpha_i$ such that $P(\alpha_i)$ is a boundary point of d. Note that P is the canonical representation of a linear path in $\mathbb{R}^n$ in functional form and that P is one-to-one and onto and therefore invertible. FIG. 7 depicts boundary steps $\alpha_i$ for the discontinuous part d of the model $f(x, y, d(x, y))=d(x, y)\sin(x+y)$. For the example shown in FIG. 7, $\alpha_1=0.25$, $\alpha_2=0.5$, $\alpha_3=0.583$, and $\alpha_4=0.75$. In some implementations, the model access information (e.g., BoundaryInfo shown FIG. 1) is accessed by the model evaluation system 120 and identifies the boundary points and indicates the x, y and $d(x,y)$ values for each boundary point of the model $f(x, y, d(x, y))=d(x, y)\sin(x+y)$ along the straight line path P (e.g., line 501 shown in FIG. 5). In some implementations, let $\alpha_0$ be 0 and $\alpha_5$ be 1, then the method 200 includes computing the midpoints between each $\alpha_i$, and subsequently computes the array $d_m$, the values of d at those midpoints of $\alpha_i$, as follows:

for each i in [0, 5] in the integers let $m=(\alpha_i+\alpha_{i+1})/2$ let $(x, y)=P(m)$ let $d_m[i]=d(x,y)$ So for the example function f depicted in FIGS. 5 and 7, the values of the array $d_m$ are <6,9,6,2,3>. FIG. 8 depicts the input space of $d(x,y)$. FIG. 9 depicts the straight line path 901 (e.g., line 501 shown in FIG. 5) in the input space of $d(x,y)$ (e.g., FIG. 8) from the reference point 502 (shown in FIG. 5) to the evaluation point 503 (shown in FIG. 5). FIG. 10 depicts $d(P(\alpha))$ for $\alpha \in [0,1]$ along the function P generating the straight line path (shown, for example, as the line 501 in FIG. 5) in the input space of FIG. 8 from the reference point 502 (shown in FIG. 5) to the evaluation point 503 (shown in FIG. 5). In some variations, it is possible for a given value of $\alpha$ to correspond to tests associated with more than one variable, it is possible for one or both ends of the path to lie on a decision boundary, or that the path lie entirely along a decision boundary; these cases are described herein with respect to description related to the attribution of explainability amounts at decision boundaries; the computation of the values of $d_m$ is not affected by any of those cases beyond the fact that when a path ends at a decision boundary, the corresponding value of $\alpha$, whether it be the first value $\alpha_0$, the last value $\alpha_k$ or both, is duplicated, and thus the corresponding value or values, d[1], d[k], or both, are actually the value of d computed at the corresponding endpoint.

In some variations, the model access information (e.g., BoundaryInfo shown in FIG. 1) (e.g., accessed at S211) for a discontinuous model (or sub-model) includes information for accessing model (or sub-model) values of $d_m$. In some variations, the model access information (e.g., BoundaryInfo) for a discontinuous sub-model includes information for accessing a sub-model value before a specified decision boundary point (e.g., of the discontinuous sub-model) (e.g., by computing d on a point before the decision boundary). In some variations, the model access information (e.g., BoundaryInfo) for a discontinuous sub-model includes information for accessing a sub-model value after a specified decision boundary point of the discontinuous sub-model (e.g., by computing d on a point after the decision boundary). In some variations, the method 200 does not attempt to compute the value of d at the decision boundary, which may be undefined.

In some variations, the model access information (e.g., accessed at S211) for a sub-model includes information for accessing input data sets for a reference population. In some variations, the model access information for a sub-model includes information for accessing a score generated by the sub-model for a specified input data set. In some variations, the model access information for a sub-model includes input data sets for a reference population. In some variations, the model access information for a sub-model includes scores generated by the sub-model for input data sets of a reference population. In some variations, the model access information for a sub-model includes API information for the sub-model that allows the caller to send an input value and receive the model score corresponding to that input value. In some variations, the model access information for a sub-model includes a URL and corresponding authentication information for accessing input data sets for the sub-model and generating a score for a specified input data set by using the sub-model. In some variations the API is a REST API, in some it is a SOAP API, in others it is an EDI API, a remote procedure call, named pipe, or function call within a process.

In some variations, the model is an ensemble model that includes at least one tree sub-model and at least one differentiable sub-model. In some variations, the ensemble model includes at least one of: a decision tree, a gradient-boosted tree, a multi-layer perceptron, a deep neural network, an autoencoder, a Boltzman machine, an LSTM model, a support vector machine, a random forest, an extra-random forest, a bayesian classifier, a linear model, a generalized additive model, a Gaussian mixture model, and a generalized linear model. In some variations, the ensemble function is a linear combination of sub-model scores. In some variations, the ensemble function is computed by ridge regression on the sub-model scores against the prediction outcome using a separate hold-out data set. In some variations, the ensemble model is a neural network.

In some variations, explainability information is computed (e.g., by the model evaluation system 120) by breaking up the explainability problem for a pair of items, an input item $x_i$ and a reference item $x_i'$, into a set of subproblems, each one corresponding to one of the intervals between a value $\alpha_i$ and a value $\alpha_{i+1}$ as described above. For each such interval, the compound model function f(x, y, d(x, y)) can be viewed as being a function of the form $F_i(\alpha)=f(x_\alpha, y_\alpha, d_i)$ where $(x_\alpha, y_\alpha)=P(\alpha)$ for any $\alpha_i<\alpha<\alpha_{i+1}$. Each such $F_i$ is a continuous function, and so a standard technique appropriate for providing feature contribution information can be applied to that segment (e.g., by using the model evaluation system 120). In some variations, this feature contribution information is provided by applying the Integrated Gradients method presented in Sundararajan et al. (2017) (by using the model evaluation system 120). In some variations, this feature contribution information is provided by methods such as LIME, LOCO, DeepLift ("Learning Important Features Through Propagating Activation Differences", Shrikumar et al. (2017)), or other similar systems. In some variations, these partial attributions (feature contribution information) are then accumulated together (e.g., by using the model evaluation system 120) to create a single global attribution corresponding to contributions of the segments.

Attributions at the boundaries $\alpha_i$ is described as follows. Let $(x_\alpha, y_\alpha)=P(\alpha)$. In some variations, the model evaluation system 120 determines the amounts of the attributions at the boundaries $\alpha_i$ by computing $f(x_\alpha, y_\alpha, d[i+1])-f(x_\alpha, y_\alpha, d[i])$.

The model evaluation system 120 assigns the attributions to the variable at which the boundary occurs. That is, if the variable X is the unique variable corresponding to the boundary at $\alpha_i$, then that difference is associated with the variable X. In some variations, as noted above, there are several edge cases: one arising from a boundary at an endpoint, for which the method described here goes through unchanged, one arising from a case where a given linear path has a value $\alpha_i$ associated with more than one variable, in which case the explainability amount is assigned (by the model evaluation system 120) to all variables associated with the boundary in even amounts. In some variations, another edge case is the one in which a path runs along a decision boundary; in that case, the model evaluation system 120 associates all credit associated with any further intersection with the variable or variables along which the path proceeds.

In some variations, after the model evaluation system 120 assigns the attributions to the variable at which the boundary occurs, the model evaluation system 120 then collects these assignments of attributions across all boundaries to fill in the blanks at the boundaries $\alpha_i$. In some variations, the combination of the attribution values assigned for the boundary points with the global attribution corresponding to contributions of the continuous segments yields a complete attribution of explainability amounts for all input variable values $x_i$, for any heterogeneous ensemble of differentiable and non-differentiable models, like those of the form f(x,y,d(x, y)) as discussed herein. In some variations, this same method can be used to compute explainability information for a model comprising many input variables, and generally applies to any piecewise integrable function on $\mathbb{R}^n$. In some variations, the method is an application of the Hahn Decomposition Theorem and the Radon-Nikodym Theorem to the measure on $\mathbb{R}^n$.

In some variations, the explainability information computed by the method 200 described herein is a decomposition of a model score expressed as a sum of values in $\mathbb{R}$, each associated with one input variable.

Returning to FIG. 2, in some variations, S212 includes: for each sub-model specified by the model access information (e.g, accessed at S211), the model evaluation system 120 determining a decomposition for a sub-model score for an evaluation input data set (x) relative to the reference population x'. In some variations, S211 includes: the model evaluation system 120 accessing the evaluation input data set from the modeling system 110. In some variations, S211 includes: the model evaluation system 120 accessing the evaluation input data set from a storage device (e.g., 181 shown in FIG. 1). In some variations, S211 includes: the model evaluation system accessing the evaluation input data set and the corresponding sub-model score for each sub-model from the modeling system 110. In some variations, S211 includes: for each sub-model of the modeling system 110, the model evaluation system accessing a sub-model score for the evaluation input data set. In some variations, S211 includes: the model evaluation system accessing the evaluation input data set, and generating the corresponding sub-model score for each sub-model by accessing the modeling system. In some variations, S211 includes: for each sub-model of the modeling system 110, the model evaluation system generating a sub-model score for the evaluation input data set by accessing the modeling system.

In some variations, S212 includes: for each sub-model specified by the model access information (accessed at S212), the model evaluation system determining a decomposition for a sub-model score for an evaluation input data set (x) by using the input data sets for the reference population.

Figure 11:
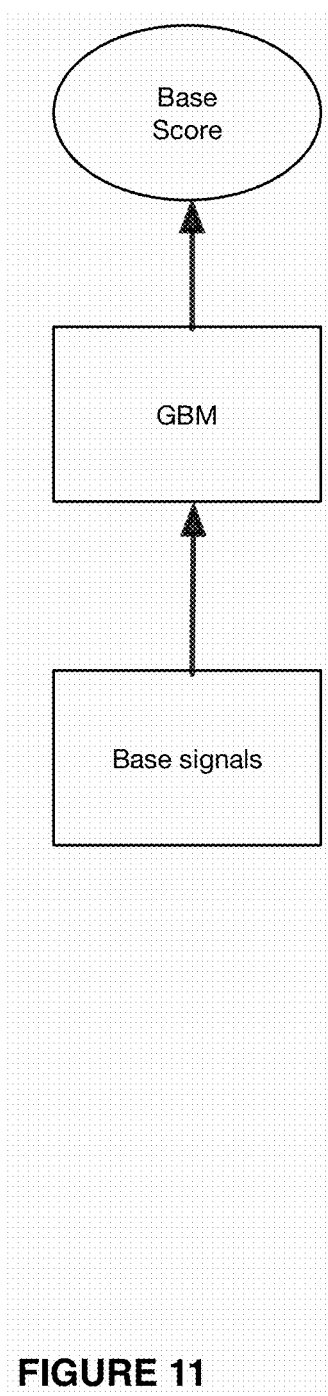
FIGS. 11-15 are representations of models, according to variations.

In some variations, any of the previously described variations can be applied to any ensemble model which can be separated into two parts, a discontinuous sub-model, d(x), and a continuous model of the form f(x, d(x)) including both the elements of the input space directly and indirectly through the discontinuous model. In some variations, even if f is itself continuous and possibly well-behaved, the composition of f with d might not be continuous if d itself is not continuous. Schematics of several such models are shown in FIGS. 11-15. FIG. 11 shows a pass-through model in which a collection of base features or "signals" is passed through a gradient boosted tree forest (GBM) and the result of that operation presented as a score. In some embodiments, this model is of the form specified above: d is the gradient boosted tree model, and the function f(x, d(x))=d(x). Notice that f itself is exceptionally well-behaved, as it is just the identity on one variable, but the resulting ensemble model is discontinuous and ill-behaved, at least when considered as a machine learning model.

Figure 12:
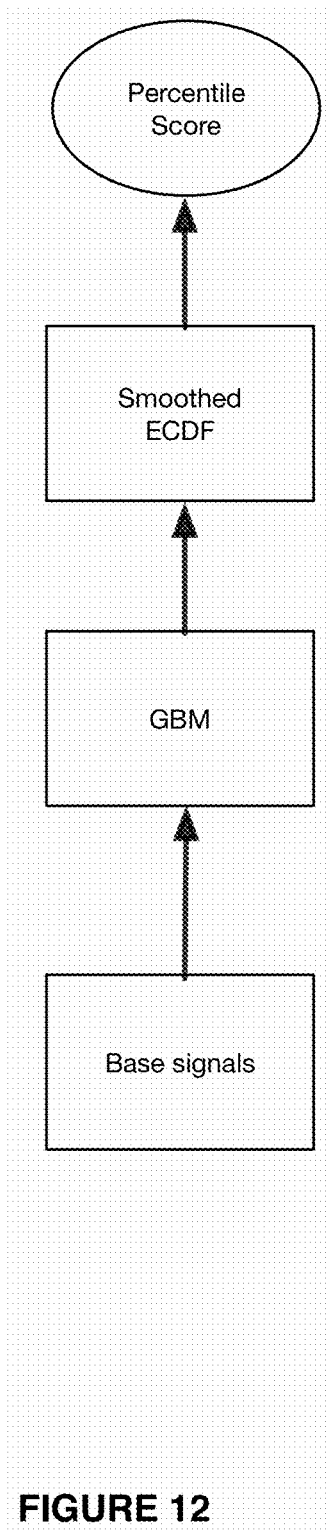

FIG. 12 shows a pass-through model in which the output of a GBM is then subsequently transformed through a "Smoothed approximate ECDF". An empirical cumulative distribution function (ECDF) is a function which, among other things, transforms the distribution of output values of a function in such a way that the fraction of items with values below a certain level in the ECDF is exactly that level: that is, if E is the ECDF associated with a model function f, then exactly 10% of all inputs will be such that $E(f(x))<0.1$, 20% will be such that $E(f(x))<0.2$, etc. A Smoothed approximate ECDF, S, is a continuous function which closely approximates a real ECDF but is continuous and almost everywhere differentiable. That is, almost exactly 10% of all inputs will be such that $S(f(x))<0.1$, 20% will be such that $S(f(x))<0.2$, etc. In some implementations, the ECDF's are not continuous, much less differentiable, but one can build a smooth approximate ECDF which arbitrarily closely approximates the original ECDF by the standard expedient of approximating the ECDF with any suitable technique. In some variations, this technique is at least one of: a piecewise linear approximation, a polynomial interpolant, a monotone cubic spline, the output of a general additive model, etc.

By composing the output of a GBM through a smoothed ECDF, S, one obtains a model of the form f(x, d(x))=S(d(x)), which meets the functional requirement for the Generalized decomposition method described herein. This modified form is useful, however, as lenders or other underwriters usually wish to approve only a fixed percentage of loans and such a transformation through a smoothed ECDF makes this possible. The methods described herein, however, are the first methods to correctly provide explanation information for ensemble models of this type.

Figure 13:
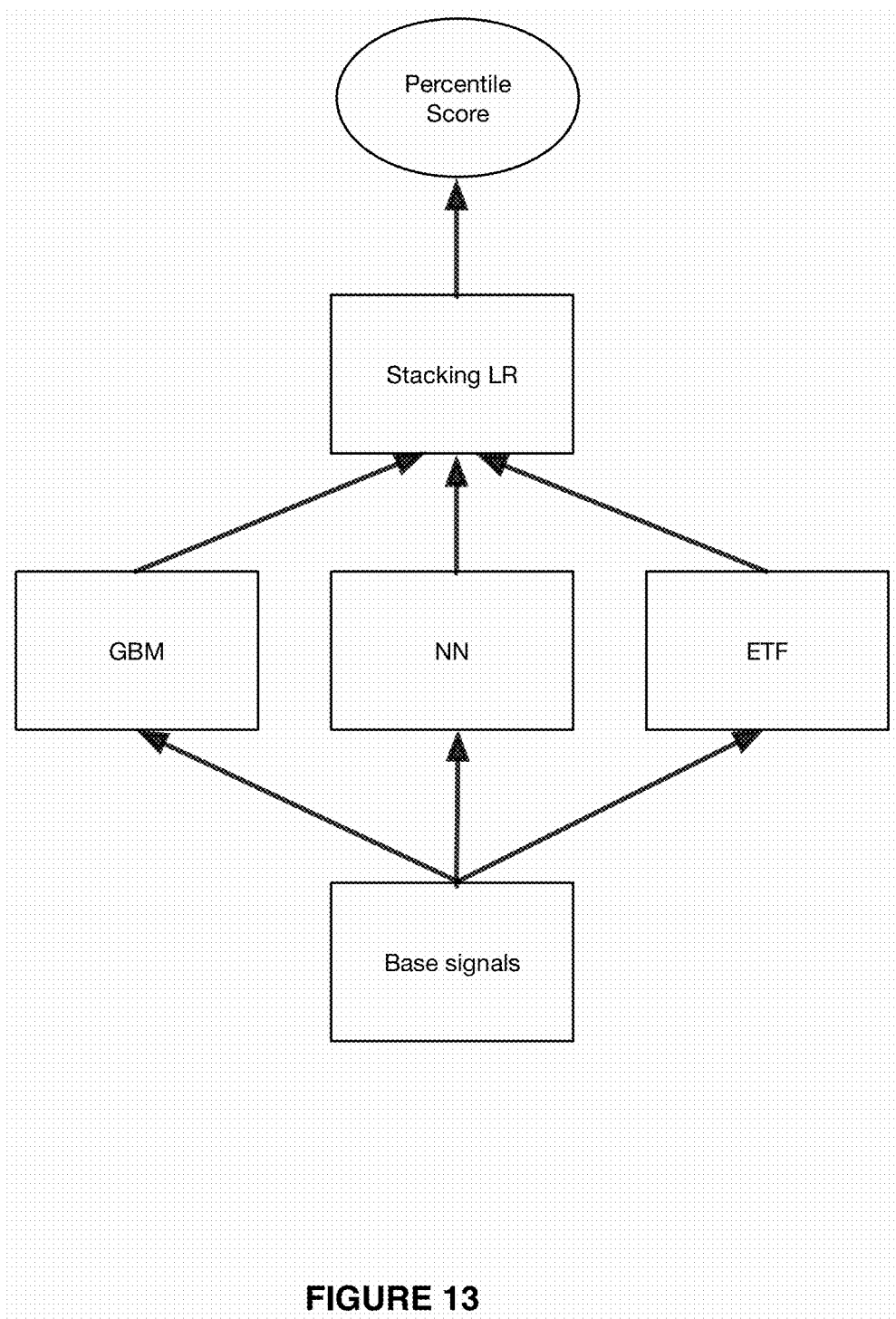

FIG. 13 displays a compound model in which the outputs of three submodels, a GBM, a neural network (NN), and an Extremely Random Forest (ETF) are ensembled together using a simple linear stacking function. Such ensembles provide very powerful machine learning models and are used frequently in machine learning models. Such a model can be presented in the form f(n(x), g(x), e(x)), where f denotes the final linear ensembling function, n denotes the continuous output of the neutral network submodel, g denotes the discontinuous output of the GBM, and e denotes the discontinuous output of the ETF. Despite the apparent difference in formalism, such models can be seen to be of the form to which the Generalized decomposition method described herein applies.

Figure 14:
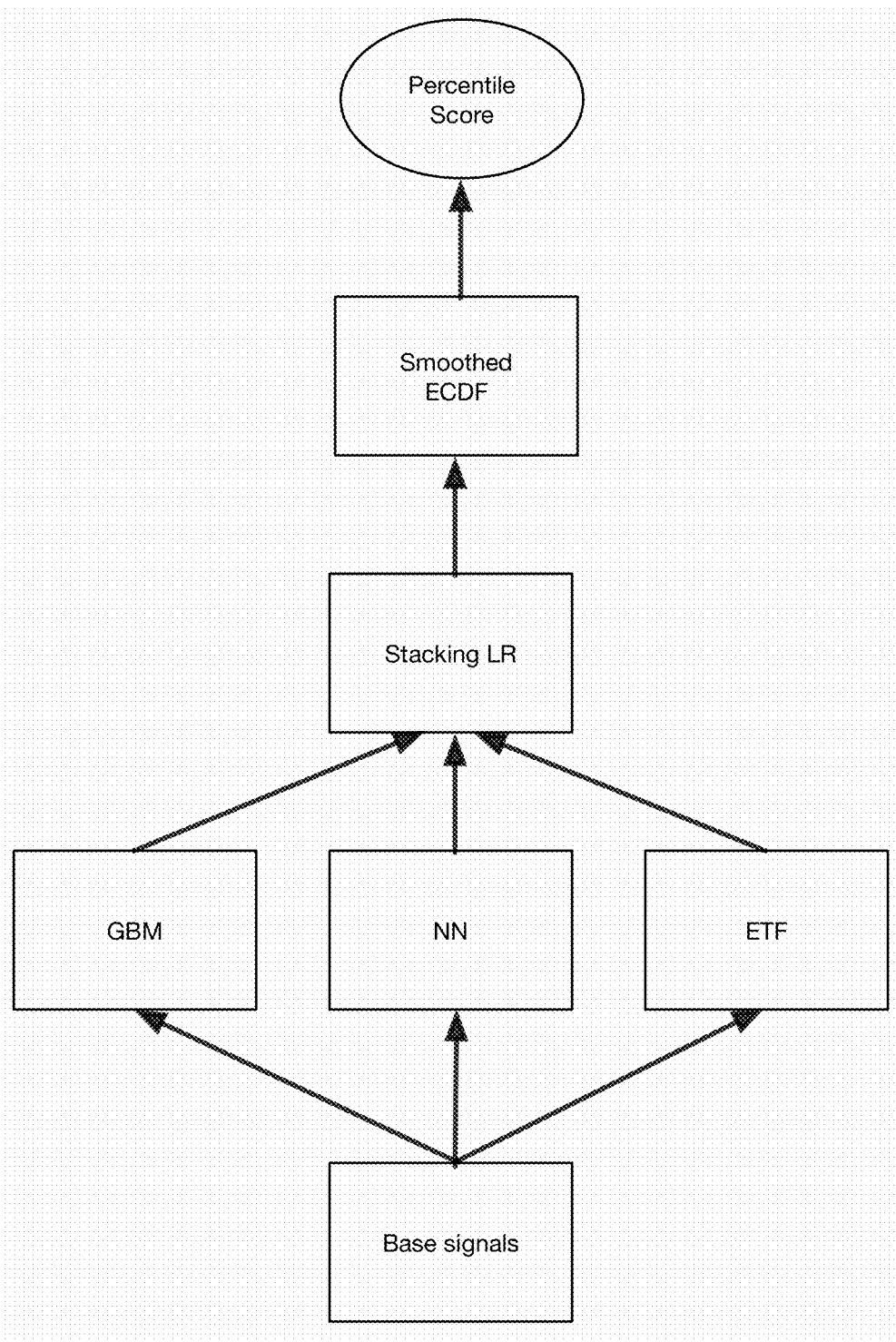

FIG. 14 shows the schematic of a model which combines aspects of the models shown in FIGS. 12 and 13: it contains three submodels, a neutral network (NN), a GBM, and an ETF and a linear ensembling layer, as shown in FIG. 13, but subsequently reprocesses the output of that linear ensembling layer through a Smoothed ECDF. This class of models is useful, because it not only achieves the high discriminative power of the model shown in FIG. 13, but also provides the very desirable uniform output properties of a model which produces outputs through a smoother ECDF, as in the model shown in FIG. 12.

Figure 15:
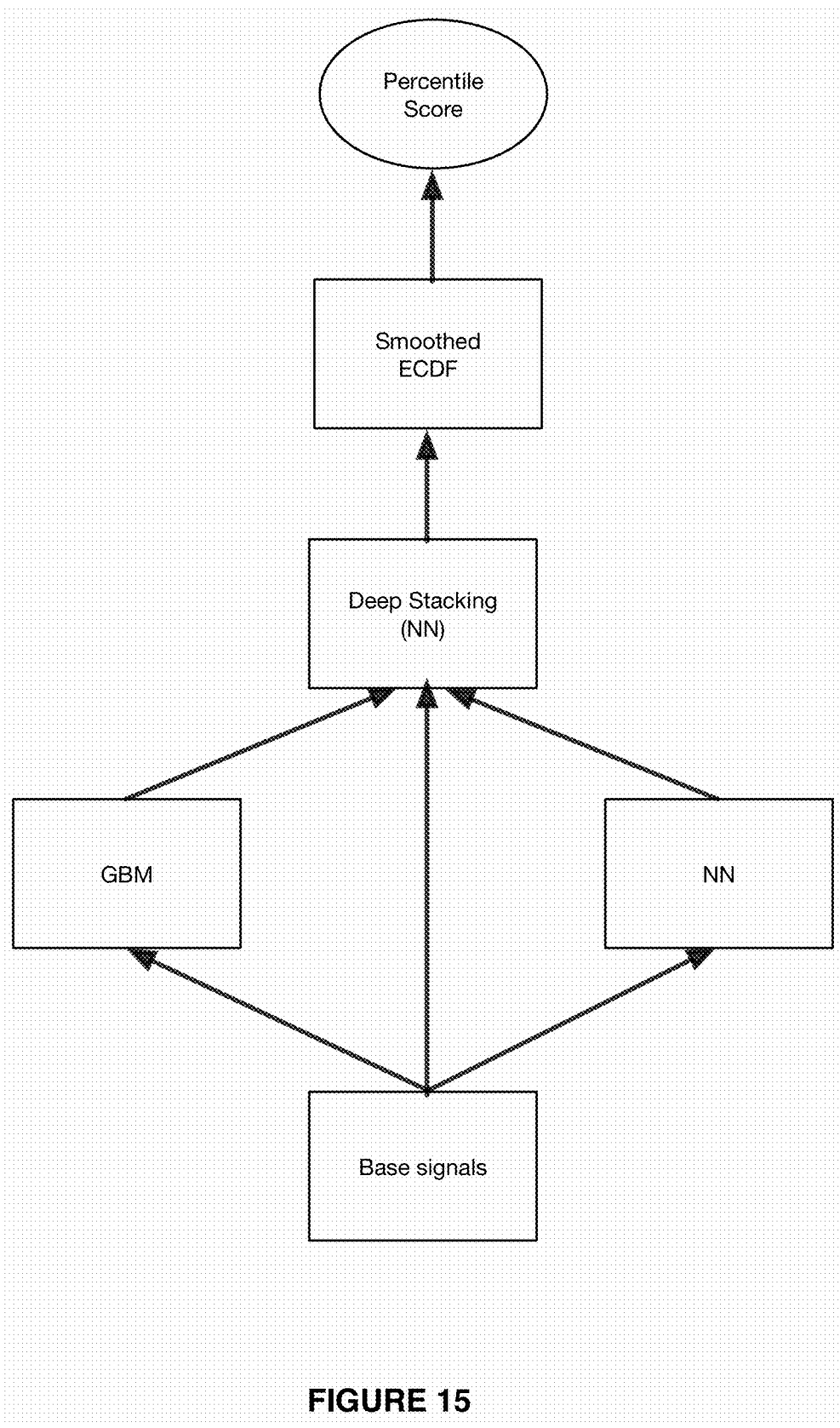

FIG. 15 shows the schematic of a model similar to the model shown in FIG. 14, but replaces the linear stacking layer in the model shown in FIG. 14 with a neural network model. Networks with this form can preserve the representational power and desirable output structure of the model shown in FIG. 14, but can add greater flexibility in their final step. This greater flexibility allows the construction of models which meet specific fairness criteria (e.g. Louppe et al., 2017), provide local confidence estimates (Lakshminarayanan et al., 2017)) or exhibit combinations of those along with other desirable properties. In some variations, the deep stacking neural network model shown in FIG. 14 can be replaced with any suitable type of continuous machine learning model, such as, for example, a radial basis function layer, a Gaussian mixture, a recurrent neural network, an LSTM, an autoencoder, and the like.

It will be obvious to one of usual familiarity with the art that there is no limitation on the number or kind of the inputs to these models, and that the use previously of an example function with domain a subset of $R^2$ was merely presented for clarity. It will also be obvious to one of reasonable skill in the art that the presentation of a single layer of discrete machine learning models with outputs being fed into a single ensembling layer is purely for pedagogical clarity; in fact, in some variations of these systems, a complex and complicated network of ensemblers can be assembled. Machine learning models of that type are routinely seen performing well in machine learning competitions, and have also been used at Facebook to construct and improve face recognition and identification systems.

In some variations, S212 includes: the model evaluation system 120 determining a decomposition for an ensemble model score for the evaluation input data set (x).

In some variations, the method 200 can be used on ensembles of ensembles and can be applied to ensembling methods wherein submodel scores are combined using another machine learning model. In some variations, at least one sub-model is an ensemble model. In some variations, at least one sub-model is a linear ensemble. In some variations, at least one sub-model is a stacked ensemble model. In some variations, at least one sub-model is a linear model. In some variations, at least one sub-model is a bagged ensemble model. In some variations, at least one sub-model is a forest of boosted trees ensemble model. In some variations, the ensemble model is a stacked ensemble model. In some variations, the ensemble model is a support vector machine. In some variations, the ensemble model is a neural network. In some variations the ensemble model is a deep neural network. In some variations the ensemble model is a neural network or a linear model constructed using a generative adversarial network. In some variations the ensemble model is a gaussian mixture model, a polynomial, a spline, a average, or other computable continuous function.

In some variations the ensemble function is a differentiable model such as a neural network, radial basis function, bayesian mixture, Gaussian mixture, polynomial, rational function, kernel-based support vector machine, or other differentiable function. Recall that if f and g are differentiable then f(g) is also differentiable by the chain rule. And so if g is piecewise-differentiable then f(g) is also piecewise differentiable. In these variations, the piecewise partial derivative of the ensemble, with respect to each input variable is integrated along a path as described above, and added to the function differences at the non-differentiable boundaries $\alpha_i$ in order to quantify the influence of an input variable in the ensemble.

In some variations, the method 200 includes: the model evaluation system accessing the ensemble model score for the evaluation input data set from the modeling system. In some variations, the method 200 includes: the model evaluation system generating the ensemble model score for the evaluation input data set by accessing the modeling system.

Model Decomposition

In some variations, S212 includes the model evaluation system 120 determining a decomposition for a model (e.g., an ensemble) for an evaluation input data set (x) relative to a reference population (x'). In some variations, S212 includes: determining a decomposition for model score (e.g., ensemble score) for an evaluation input data set (x) relative to a reference population (x') by performing at least one of the processes S310-S350. In some variations, the decomposition module 122 performs at least a portion of S212. In some variations, the model is a perceptron, a feed-forward neural network, an autoencoder, a probabilistic network, a convolutional neural network, a radial basis function network, a multilayer perceptron, a deep neural network, or a recurrent neural network, including: Boltzman machines, echo state networks, long short-term memory (LSTM), hierarchical neural networks, stochastic neural networks, a tree model, a forest model, a gradient boosted tree model, an adaboost model, a non-differentiable model, a differentiable model and other computable functions, without limitation.

In some variations, the decomposition module (e.g., 122 shown in FIG. 1) accesses, for each discontinuous sub-model, information identifying decision boundary points for the discontinuous sub-model (e.g., BoundaryInfo shown in FIG. 1). In some variations, the decomposition module 122 accesses the information identifying decision boundary points (e.g., BoundaryInfo) from a storage device (e.g., 182 shown in FIG. 1). In some variations, the decomposition module 122 accesses the information identifying decision boundary points (e.g., BoundaryInfo) from the modeling system 110, which is communicatively coupled to the model evaluation system via a computer network. In some variations, the decomposition module is included in the modeling system 110, and the decomposition module accesses the information identifying decision boundary points (e.g., BoundaryInfo) from the sub-model. In some variations, the sub-model is a tree. In some variations, the sub-model is a forest, in other variations the forest sub-model is a random forest, in other variations, the forest sub-model is a gradient boosted tree model. The decision boundary points may be computed using any suitable method, some of which are described herein, above.

In some variations, determining a decomposition for a model score (e.g., an ensemble score) for the evaluation input data set (x) by using the decomposition module (e.g., 122) includes: generating a reference input data set (x'); and determining the decomposition for the model score for the evaluation input data set (x) by using the decomposition module (e.g., 122) to generate the decomposition relative to the reference input data set (x').

In some variations, generating the decomposition of the evaluation input data set relative to the reference input data set includes, S310 shown in FIG. 3.

In some variations, S212 includes determining the straight line path (e.g., line 501 shown in FIG. 5) in the input space from the reference input data set x' (e.g, 502 shown in FIG. 5) to the evaluation input data set x' (e.g., 503 shown in FIG. 5) (S310 shown in FIG. 3), and if any decision boundary points (e.g., points 504-507 of FIG. 5, information corresponding to BoundaryInfo shown in FIG. 1) are accessed for the model (e.g., sub-model) (S320 shown in FIG. 3), segmenting the straight line path (e.g., 501) into segments at each boundary point, the straight line path being segmented into a plurality of segments (S321 shown in FIG. 3).

In some variations, S330 includes, for each feature i, of the input space, determining a partial derivative of the model with respect to the feature i along the segment; and computing the Lebesgue integral relative to the measure induced on the linear path using the standard measure induced on that linear path by the canonical topology on $\mathbb{R}^n$ of the partial derivatives along that segment. In some variations, performing the methods herein on modern computing machinery can be improved by subdividing the problem so that numerical integration methods may be applied and still achieve reasonable runtime performance. Therefore, in some variations, the Lebesgue integral is computed by first scaling each segment to have unit length, computing the integrals corresponding to all segments simultaneously (which makes efficient use of multiprocessor hardware), determining products of the computed integral and the differences between the value $x_{i\text{-}begin\text{-}seg}$ at the beginning of the segment and the value $x_{i\text{-}end\text{-}seg}$ at the end of the segment. In some variations, this process is performed in parallel for each feature i of the evaluation input data set. The application of Lebesgue integration to solve the piecewise integration problem created by ensembles of tree-based models (non-differentiable models) and neural networks (differentiable models) enables the generalization of Integrated Gradients (Sundararajan, et al., 2017) to piecewise differentiable functions such as those described herein. This new and useful technique is a non-obvious application of multivariate analysis to the practical problem of explaining outputs generated by heterogeneous ensembles of differentiable and non-differentiable models, including deep stacks of models ensembled using continuous functions such as deep neural networks.

In some variations, the model evaluation system 120 determines each partial derivative of the model for all selected values of each feature i. In some variations, the model evaluation system 120 uses the modeling system 110 to determine each partial derivative of the model for all selected values of each feature i. In some variations, the model evaluation system 120 uses the modeling system 110 to determine each partial derivative of the model for all selected values of each feature i via an API of the modeling system 110. In some variations, the API is a REST API. In some variations, the API is an API that is accessible via a public network. In some variations, the API is an API that is accessible via an HTTP protocol. In some variations, the API is an API that is accessible via a remote procedure call.

In some variations, the model evaluation system 120 determines each partial derivative of the model for each selected value of each feature i by using a gradient operator on the ensemble and the continuous sub-models to determine the partial derivatives for each selected value. In some variations, the model evaluation system 120 uses the modeling system 110 to determine each partial derivative of the model for each selected value of each feature i by using a gradient operator of the modeling system on the ensemble and the continuous sub-models 110.

In some variations, the decompositions for each segment are summed (sum of segment decompositions) together to produce a sum of the segment decompositions to determine the contribution of the continuous sub-models and ensemble function to the model explainability information.

In some variations, for each boundary point (e.g. points 504-507 shown in FIG. 5) along the straight line path from the reference input data set (e.g., 502) to the evaluation input data set (e.g., 503), a contribution value of a discontinuous model is determined and a determination is made as to which feature of the input space the contribution value is attributed. In some variations, the decomposition module 122 determines at least one contribution value. In some variations, for each feature in the input space, the determined contribution values assigned to the feature are added to the sum of the contribution values for the features that are included in the segment decompositions, thereby producing a decomposition of the evaluation input data set x relative to the reference input data set x'.

In some variations, generating the decomposition of the evaluation input data set relative to the reference input data set includes (for each feature i of the input space): for each segment of the plurality of segments, determining a set of values $\upsilon$ along the segment (e.g., $\upsilon=(x_i+(k/m)(x_{ib}-x'_{ie}))$, for $1<=k<=m$), wherein $x_{ib}$ is the beginning point on the segment and $x_{ie}$ is the end point on the segment; determining a derivative of the model for each determined value v $$\left(e.g., \frac{\partial F(v)}{\partial x_i} = \frac{\partial F\left(x' + \frac{k}{m} \times (x-x')\right)}{\partial x_i} \text{ for } 1 <= k <= m\right),$$

for model F); determining a sum of the derivatives $$\left(\sum_{k=1}^{m} \frac{\partial F\left(x' + \frac{k}{m} \times (x-x')\right)}{\partial x_i}\right);$$

determining a product of the determined sum and a difference between the value $x_i$ of feature i of the evaluation input data set and the value $x'_i$ of the feature i of the reference input data set $$\left(e.g., (x_i - x'_i) \times \sum_{k=1}^{m} \frac{\partial F\left(x' + \frac{k}{m} \times (x-x')\right)}{\partial x_i}\right);$$

and determining a decomposition value $d_i$ for the feature i by dividing the determined product for feature i by m $$\left(e.g., (x_i - x'_i) \times \sum_{k=1}^{m} \frac{\partial F\left(x' + \frac{k}{m} \times (x-x')\right)}{\partial x_i} \times \frac{1}{m}\right),$$

wherein the decomposition for the segment is a linear combination of the determined decomposition values $d_i$ for each feature i of the evaluation input data set (e.g, segment decomposition=$d_1+d_i+\ldots+d_n$) (S332).

In some variations, generating the decomposition of the evaluation input data set relative to the reference input data set includes (for each feature i of the input space): for each segment of the plurality of segments, determining a set of values $\upsilon$ along the segment (e.g., $\upsilon=(x_i+(k/m)(x_{ib}-x'_{ie}))$, for $1<=k<=m$), wherein $x_{ib}$ is the beginning point on the segment and $x_{ie}$ is the end point on the segment; determining a derivative of the model for each determined value v $$\left(e.g., \frac{\partial F(v)}{\partial x_i} = \frac{\partial F\left(x' + \frac{k}{m} \times (x-x')\right)}{\partial x_i} \text{ for } 1 <= k <= m\right),$$

for model F); and these values are used as the inputs to a higher-order numerical integration process to estimate the underlying integral (S332).

In some variations, generating the decomposition of the evaluation input data set relative to the reference input data set includes (for each feature i of the input space): for each segment of the plurality of segments, determining a set of values $\upsilon$ along the segment (e.g., $\upsilon=(x_i+(k/m)(x_{ib}-x'_{ie}))$, for $1<=k<=m$), wherein $x_{ib}$ is the beginning point on the segment and $x_{ie}$ is the end point on the segment; determining a derivative of the model for each determined value v $$\left(e.g., \frac{\partial F(v)}{\partial x_i} = \frac{\partial F\left(x' + \frac{k}{m} \times (x-x')\right)}{\partial x_i} \text{ for } 1 <= k <= m\right),$$

for model F); and these values are used as the inputs to a higher-order numerical integration process to estimate the underlying integral by means of a function call into a library implementing this integration process (S332). In some variations the method is Romberg integration (which repeatedly applies a quadrature), in other variations the method is Simpson's rule.

Determining Contribution Values of Each Variable in the Model for Each Boundary Point of the Straight Line Path In some variations, S340 includes determining a contribution value of the model for a boundary point $x_{boundary-i}$ of the straight line path (e.g., contribution values for output values at $\alpha$ steps=0.25, 0.5, 0.583 and 0.75 shown in FIGS. 5, 7 and 10). In some variations, determining a contribution value of the model for a boundary point $x_{boundary-i}$ of the straight line path includes: determining a difference between a discontinuous model output value (e.g., an output value shown in FIG. 10) for a point on the straight line path (e.g., 501 shown in FIG. 5) before the boundary point (e.g., one of boundary points $\alpha$=0.25, 0.5, 0.583 and 0.75 shown in FIGS. 5 and 9) and a discontinuous model output value for a point on the straight line path after the boundary point, and applying the ensemble function to the difference in value and assigning the ensemble function result to a feature as a contribution value for that feature with respect to the model. In some variations, determining a contribution value for a feature i of the model for a boundary point $x_{boundary-i}$ of the straight line path includes: determining a difference in output value between 1) the limit from the left of the boundary point for the piecewise continuous ensemble model as the input of the model approaches the boundary point, and 2) a limit from the right of the boundary point for the piecewise continuous ensemble model as the input of the model approaches the boundary point. In some variations, in order to compute the limit from the left, the decomposition module 122 accesses a model output value $\upsilon_{left}$ (e.g., BoundaryInfo shown in FIG. 1) for a point on the straight line path before the boundary point and computes fleft=$f(x_{boundary-i}, \upsilon_{left})$. In some variations, in order to compute the limit from the right, the decomposition module 122 accesses a model output value $\upsilon_{right}$ (e.g., BoundaryInfo shown in FIG. 1) for a point on the straight line path after the boundary point and computes $f_{right}=f(x_{boundary-i}, \upsilon_{right})$. In some variations, the decomposition module 122 further computes the average $(f_{right}+f_{left})/2$ and assigns the value of this difference to a feature as a contribution value for the feature i, if the boundary point corresponds to the feature i. In some variations, a boundary point corresponds to the feature i, if the boundary point occurs in a decision point of the discontinuous model in expressions whose value depends on feature i.

In some variations, the left limit is computed by evaluating the model on the boundary point (e.g., boundary point 1011 shown in FIG. 10) with the value of the discontinuous sub-model at the midpoint of the previous segment (e.g., output value 1001 shown in FIG. 10) and the right limit is computed by evaluating the model on boundary point with the value of the discontinuous sub-model at the midpoint of the next segment (e.g., output value 1002 shown in FIG. 10). In some variations, this differencing operation depends on the fact that (a) the ensemble function is continuous on its inputs, (b) any discontinuous model is piecewise constant, (c) each discontinuity of the discontinuous sub-model is easily found, and (d) any discontinuous model output enters the ensemble function directly as an input. This practical method of computing the contributions of input variables is a non-obvious contribution to the art and is useful in explaining complex models, such as those models which may be used, for example, in approving credit applications.

In some variations, the decomposition module 122 accesses information (e.g., BoundaryInfo shown in FIG. 1) that indicates for each boundary point, the feature of the input data set that corresponds to the boundary point in each of the discontinuous sub-models in the ensemble model.

In some variations, for each boundary point $x_{boundary-i}$ (e.g., 504-507 shown in FIG. 5) of the straight line path 501, the decomposition module 122 accesses a model output value $\upsilon_{left}$ (e.g., BoundaryInfo shown in FIG. 1) for a point on the straight line path before the boundary point and a model output value $\upsilon_{right}$ for a point on the straight line path after the boundary point. For example, as shown in FIG. 10, output value 1001 is $\upsilon_{left}$ for boundary point 1011, and output value 1002 is $\upsilon_{right}$ for boundary point 1011. In some variations, for each boundary point $x_{boundary-i}$ (e.g., points 504-507) of the straight line path 501, the decomposition module 122 accesses $\upsilon_{left}$ and $\upsilon_{right}$ (e.g., BoundaryInfo shown in FIG. 1). In some variations the ensemble function f is applied to its other inputs at $x_{boundary-i}$, $\upsilon_{left}$ and $\upsilon_{right}$ and the difference $f(x_{boundary-i}, \upsilon_{left})-f(x_{boundary-i}, \upsilon_{right})$ is computed to arrive at the contribution of i for the ensemble model.

In some variations, the point on the straight line path before the boundary point is a midpoint of the segment preceding the boundary point (e.g., the point before the boundary point 1011 corresponds to the α value for output value 1001), and the point on the straight line path after the boundary point is a midpoint of the segment following the boundary point (e.g., the point after the boundary point 1011 corresponds to the a value for output value 1002).

In some variations, the model evaluation system 120 uses the modeling system 110 to determine a difference in output value between a discontinuous model output value for a point on the straight line path before the boundary point and a model output value for a point on the straight line path after the boundary point, applies the ensemble function to the endpoints, computes the difference, and assigns the result to a feature as a contribution value for that feature by using an API of the modeling system 110. In some variations, the model evaluation system 120 uses the modeling system 110 to determine whether a boundary point corresponds to the feature i, by using the API of the modeling system 110.

In some variations, the API of the modeling system 110 is a REST API. In some variations, the API is an API that is accessible via a public network. In some variations, the API is an API that is accessible via an HTTP protocol. In some variations, the API is an API that is accessible via a remote procedure call.

8. Machines

The systems and methods of some variations and variations thereof can be embodied and/or implemented at least in part as a machine configured to receive a computer-readable medium storing computer-readable instructions. The instructions are preferably executed by computer-executable components. The computer-readable medium can be stored on any suitable computer-readable media such as RAMs, ROMs, flash memory, EEPROMs, ASICs, FPGAs, an electronic circuit, optical devices (CD or DVD), hard drives, floppy drives, or any suitable device. In some implementations, the computer-executable component is a general or application specific processor, but any suitable dedicated hardware or hardware/firmware combination device can alternatively or additionally execute the instructions.

9. Conclusion

As a person skilled in the art will recognize from the previous detailed description and from the figures and claims, modifications and changes can be made to the variations disclosed herein without departing from the scope defined in the claims.

What is claimed is:

1. A method implemented by a model evaluation system and comprising:
  accessing model access information for a machine learning model, the model access information identifying at least one tree structure used by the machine learning model;
  determining a feature contribution value for each of a plurality of features included in a reference input data set or an evaluation input data set, wherein the evaluation input data set represents a protected class population, each feature contribution value identifies a contribution by one of the features to a difference in output generated by the machine learning model for the evaluation input data set, relative to the reference input data set, and the determination of the feature contribution values comprises:
    identifying a path between the reference and evaluation input data sets, boundary points along the path, and segments by segmenting the path at each of the boundary points;
    determining, for each of the segments, a segment contribution value for each of the features by determining an integral of a gradient for the machine learning model along the segment for each of the features in parallel using a respective one of a plurality of processors in a multi-processor unit of the model evaluation system;

assigning a determined boundary contribution value and an end point contribution value to at least one of the features for each of the boundary points and each of a plurality of endpoints of the path, respectively; and combining, for each of the features, the corresponding segment, boundary point, and end point contribution values to generate the feature contribution value for the feature;

generating model explanation information using the determined feature contribution values and monitoring execution of the machine learning model, wherein the model explanation information explains the difference in output generated by the model for the evaluation input data set, relative to the reference input data set, and includes information relating to a model-based decision; and inserting the generated model explanation information into a stored knowledge graph for the machine learning model and generating from the knowledge graph, and outputting, a report for the machine learning model via a graphical user interface to an operator device, wherein the report comprises at least a portion of the model explanation information.

2. The method of claim 1, wherein identifying model decision boundary points along the path by using the model access information comprises comparing feature values along the path with corresponding decision-tree-node feature threshold values or decision rule threshold values identified by the model access information.

3. The method of claim 2, wherein identifying model decision boundary points along the path by using the model access information comprises identifying each leaf node included in the at least one tree structure.

4. The method of claim 3, wherein for each model decision boundary point, a boundary point contribution value is a tree structure leaf node value of the corresponding leaf node and for each boundary point contribution value, the boundary contribution value is assigned to a feature associated with the corresponding leaf node.

5. The method of claim 4, wherein for each model decision boundary point, the method further comprises determining the boundary point contribution value for the model decision boundary point comprising:

identifying a first discontinuous model output value for an input data set on the path that corresponds to a midpoint of the segment preceding the boundary point;

identifying a second discontinuous model output value for an input data set on the path that corresponds to a midpoint of the segment following the boundary point;

determining a difference between the second discontinuous model output value and the first discontinuous model output value; and determining the boundary point contribution value based on the difference.

6. The method of claim 5, further comprising:

assigning a contribution of each feature at the endpoint for each endpoint of the path between the reference input data set and the evaluation input data set; and assigning the boundary contribution value to one of the features by using the model access information.

7. The method of claim 6, wherein the machine learning model is a pass-through model in which a collection of base features is passed through a gradient boosted machine (GBM) leaning process.

8. The method of claim 6, wherein the machine learning model is a pass-through model in which an output of a gradient boosted machine (GBM) leaning process is transformed by using a Smoothed approximate empirical cumulative distribution function (ECDF).

9. The method of claim 7, wherein the machine learning model is a compound model in which outputs of a gradient boosted machine (GBM) leaning process, a neural network (NN), and an Extremely Randomized Tree (ET) are ensembled together using one of a stacking function or a combining function.

10. The method of claim 6, wherein the machine learning model is an ensemble that includes at least a neutral network (NN), a gradient boosted machine (GBM) leaning process, and an extremely randomized tree (ET) and a linear ensembling layer, wherein an output of the linear ensembling layer is processed by a differentiable function.

11. The method of claim 6, wherein the machine learning model is an ensemble that includes at least a neutral network (NN), a gradient boosted machine (GBM) leaning process, and a neural network ensembling layer, wherein an output of the ensembling layer is processed by a differentiable function.

12. The method of claim 1, further comprising identifying one or more of the reference or evaluation input data sets by using user input received via a user interface system.

13. The method of claim 1, wherein the model explanation information identifies model disparity between the evaluation input data set and the reference input data set.

14. The method of claim 1, wherein the evaluation input data set represents an applicant, the reference input data set represents a population of accepted applicants, the model explanation information explains a difference in output generated by the machine learning model for the applicant, relative to the population of accepted applicants, and the model explanation information is used to compute an adverse action reason code.

15. The method of claim 1, wherein the model explanation information identifies feature importance for a first time period and the evaluation input data set represents a population of input data sets for the first time period.

16. A model evaluation system, comprising memory comprising instructions stored thereon and a multi-processor unit coupled to the memory and configured to execute the stored instructions to:

access model access information for a machine learning model, the model access information identifying at least one tree structure used by the machine learning model;

determine a feature contribution value for each of a plurality of features included in a reference input data set or an evaluation input data set, wherein the evaluation input data set represents a protected class population, each feature contribution value identifies a contribution by one of the features to a difference in output generated by the machine learning model for the evaluation input data set, relative to the reference input data set, and the determination of the feature contribution values comprises:

identify a path between the reference and evaluation input data sets, boundary points along the path, and segments by segmenting the path at each of the boundary points;

determine, for each of the segments, a segment contribution value for each of the features by determining an integral of a gradient for the machine learning model along the segment for each of the features in parallel using a respective one of a plurality of processors in the multi-processor unit;

assign a determined boundary contribution value and an end point contribution value to at least one of the features for each of the boundary points and each of a plurality of endpoints of the path, respectively; and combine, for each of the features, the corresponding segment, boundary point, and end point contribution values to generate the feature contribution value for the feature;

generate model explanation information using the determined feature contribution values and monitoring execution of the machine learning model to analyze the identified contributions by the features, wherein the model explanation information explains the model for the evaluation input data set relative to the reference input data set;

output a report for the machine learning model via a graphical user interface to an operator device, wherein the report comprises at least a portion of the model explanation information.

17. The model evaluation system of claim 16, wherein the multi-processor unit is further configured to execute the stored instructions to:

monitor operation of the model in production to analyze feature contributions based on a generalized integrated gradients (GIG) process and a comparison of distributions of feature contributions based on model inputs and model scores selected from captured data during the model operation; and provide an alert to at least one external system via one or more computer networks in response to detecting based on the monitoring at least one of feature drift, unexpected inputs, unexpected outputs, or population stability representing an unfairness in the machine learning model with respect to a protected class.

18. A non-transitory computer readable medium having stored thereon instructions for machine learning model evaluation comprising executable code that, when executed by one or more processors, causes the one or more processors to:

access model access information for a machine learning model, wherein the model access information identifies at least one tree structure used by the machine learning model and the machine learning model is a compound model in which outputs of two or more of a gradient boosted machine (GBM) leaning process, a neural network (NN), or an Extremely Randomized Tree (ET) are ensembled together;

determine a feature contribution value for each identified of a plurality of identified features included in a reference input data set or an evaluation input data set, wherein the evaluation input data set represents a protected class population and each feature contribution value identifies a contribution by one of the features to output generated by the machine learning model for the evaluation input data set, relative to the reference input data set;

generate and output model explanation information using the determined feature contribution values, wherein the model explanation information explains the model for the evaluation input data set relative to the reference input data set;

monitor operation of the model in production to analyze feature contributions based on a generalized integrated gradients (GIG) process and a comparison of distributions of feature contributions based on model inputs and model evaluation results selected from captured data during the model operation; and provide an alert to at least one external system via one or more computer networks in response to detecting based on the monitoring at least one of feature drift, unexpected inputs, unexpected outputs, or population stability representing an unfairness in the machine learning model with respect to a protected class.

19. The non-transitory computer readable medium of claim 18, wherein the executable code that, when executed by the one or more processors, further causes the one or more processors to:

identify a path between the reference and evaluation input data sets, boundary points along the path, and segments by segmenting the path at each of the boundary points;

determine, for each of the segments, a segment contribution value for each of the features by determining an integral of a gradient for the machine learning model along the segment for each of the features in parallel using a respective one of a plurality of processors in a multi-processor unit;

assign a determined boundary contribution value and an end point contribution value to at least one of the features for each of the boundary points and each of a plurality of endpoints of the path, respectively; and combine, for each of the features, the corresponding segment, boundary point, and end point contribution values to generate the feature contribution value for the feature.

* * * * *